US00RE36445E

United States Patent [19]

Miyagawa et al.

[11] E Patent Number: Re. 36,445

[45] Reissued Date of Patent: Dec. 14, 1999

[54] OPTICAL RECORDING/REPRODUCING APPARATUS FOR OPTICAL DISKS WITH VARIOUS DISK SUBSTRATE THICKNESSES

[75] Inventors: Naoyasu Miyagawa, Suita; Yasuhiro Gotoh, Kadoma, both of Japan

[73] Assignee: Matsushita Electric Industrial Co., Ltd., Osaka, Japan

[21] Appl. No.: 08/396,981

[22] Filed: Mar. 1, 1995

Related U.S. Patent Documents

Reissue of:

[64] Patent No.: 5,235,581
Issued: Aug. 10, 1993
Appl. No.: 07/740,629
Filed: Aug. 5, 1991

[30] Foreign Application Priority Data

| | | | |
|---|---|---|---|
| Aug. 9, 1990 | [JP] | Japan | 2-212537 |
| Oct. 22, 1990 | [JP] | Japan | 2-285006 |
| Mar. 11, 1991 | [JP] | Japan | 3-044798 |

[51] Int. Cl.[6] ..... G11B 7/00

[52] U.S. Cl. ..... 369/58; 369/44.12; 369/112; 369/94

[58] Field of Search ..... 369/44.23, 112, 369/77.1, 77.2, 118, 44.12, 94, 44.11, 58; 360/133

[56] References Cited

U.S. PATENT DOCUMENTS

| | | | |
|---|---|---|---|
| 4,037,929 | 7/1977 | Bricot et al. | 369/112 |
| 4,450,553 | 5/1984 | Holster et al. | 369/94 |
| 4,841,502 | 6/1989 | Murakami et al. | 369/100 |

(List continued on next page.)

FOREIGN PATENT DOCUMENTS

0097250A2 1/1984 European Pat. Off. .

(List continued on next page.)

OTHER PUBLICATIONS

Japanese Patent Abstract, "Optical Disc Regenerator", vol.

(List continued on next page.)

*Primary Examiner*—Nabil Hindi
*Attorney, Agent, or Firm*—Stevens, Davis, Miller & Mosher, L.L.P.

[57] ABSTRACT

[An optical disc apparatus for recording, reproducing or erasing an information signal by converging a light flux onto a recording layer through a transparent substrate. The apparatus includes one or a plurality of optical heads having a plurality of objective lenses whose aberrations have respectively been corrected for a plurality of disc substrates or different thicknesses, a cartridge for enclosing the optical disc, a discrimination hole which is formed on the cartridge, and a sensor for detecting the opening/closing state of the discrimination hole and for generating a discrimination signal. In accordance with the result of the discrimination as to the thickness of the loaded optical disc, the objective lens, in which the occurrence of the aberration is smallest, is used, so that the information signal can preferably be recorded, reproduced or erased onto/from the optical discs having different substrate thicknesses. Instead of an optical head having objective lenses, an optical head having a waveguide and a plurality of converging grating couplers whose aberrations have respectively been corrected for a plurality of disc substrates of different thicknesses is provided to achieve the same object.] *An optical recording/reproducing apparatus for recording, reproducing or erasing an information signal onto/from an optical disc having at least a transparent substrate and an information layer by converging a light flux on the information layer through the transparent substrate. The apparatus includes optical converging devices, with different numerical apertures, focal distances or working distances, such as objective lenses or grating lenses, for performing aberration correction over a plurality of transparent substrates of different thicknesses of optical discs and a device for discriminating the type of optical disc based on the thicknesses of the transparent substrates. One of the optical converging devices that generates the least aberration is used according to a result of the discrimination of the thickness of the optical disc loaded in the apparatus to cause the information signal to be suitably recorded, reproduced or erased onto/from the optical discs having the different substrate thicknesses.*

82 Claims, 18 Drawing Sheets

U.S. PATENT DOCUMENTS

| | | | |
|---|---|---|---|
| 4,937,808 | 6/1990 | Shimada et al. | 369/44.11 |
| 5,091,815 | 2/1992 | Suzuki | 360/133 |
| 5,091,901 | 2/1992 | Yamamoto et al. | 360/133 |
| 5,097,464 | 3/1992 | Nishiuchi et al. | 369/112 |
| 5,173,816 | 12/1992 | Osihara | 360/133 |
| 5,208,801 | 5/1993 | Finegan | 369/100 |
| 5,255,262 | 10/1993 | Best et al. | 369/94 |

FOREIGN PATENT DOCUMENTS

| | | |
|---|---|---|
| 144436A1 | 6/1985 | European Pat. Off. . |
| 0252445A1 | 1/1988 | European Pat. Off. . |
| 0327033A2 | 8/1989 | European Pat. Off. . |
| 452953A2 | 10/1991 | European Pat. Off. . |

OTHER PUBLICATIONS

2, No. 32, Feb. 28, 1978, [Mitsubishi Denki K.K.(1)]; JP–A–52–153705.

Braat, et al., "Principles of Optical Disc Systems," 3rd Edition, 1987, pp. 170–172.

Van Nostrand's Scientific Encyclopedia, 3rd Edition, 1958, pp. 1069–1070, 1149.

OPTICAL RECORDING/REPRODUCING APPARATUS FOR OPTICAL DISKS WITH VARIOUS DISK SUBSTRATE THICKNESSES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an optical disc apparatus which can record, reproduce, or erase information signals onto/from both of an optical disc having a recording density similar to that of a conventional CD (compact disc) and an optical disc having a recording density higher than the above recording density.

2. Description of the Prior Art

In recent years, in addition to an optical disc apparatus only for reproduction such as a CD player or the like, an optical disc apparatus which can record and reproduce an information signal is actively being developed.

Ordinarily, the recording and reproduction of an information signal onto/from an optical disc are executed by converging a beam which is radiated from a semiconductor laser or the like onto a recording layer of the optical disc by a lens. The recording layer here denotes a pit layer in the case of a CD and is a layer in which a deformation, a change in optical constant, a formation of a magnetic domain, or the like is performed by a converged laser beam in the case of a recordable optical disc. To raise a recording density of the optical disc, it is necessary to reduce a spot diameter D of the converged beam. There is the following relation among the spot diameter D, a numerical aperture NA of the lens, and a wavelength $\lambda$ of the laser beam.

$$D \propto \frac{\lambda}{NA} \tag{1}$$

The above equation (1) denotes that the beam spot diameter D decreases by using a lens of a large NA. That is, by increasing NA, the high density recording can be executed.

When NA of the lens increases, however, an aberration of the converged beam due to an inclination error of the disc called a tilt increases. Particularly, a coma aberration increases. There is the following relation among a wave front aberration $W_c$ of the coma, a tilt angle $\alpha$, and NA when using a thickness d and a refractive index n of the disc substrate.

$$W_c \propto \frac{n^2 - 1}{2n^3} \cdot d \cdot \alpha \cdot (NA)^3 \tag{2}$$

The above equation (2) denotes that in the case of using a lens of NA which is larger than that of the conventional lens, even if a tilt angle is identical, the coma aberration increases. It will be understood from the equation (2), however, that there is an effect to suppress the coma aberration by setting the thickness d of the disc substrate to be thin. In the optical disc for the high density recording, therefore, it is preferable that the thickness of the disk substrate is thinner than that of the conventional optical disc, so that an optical head using an objective lens corresponding to the thin disc substrate is needed.

On the other hand, even in the optical disc apparatus corresponding to the high density recording, it is preferable that the conventional optical disc of a thick substrate can be also reproduced so that a great amount of conventional software resources can be utilized.

However, the optical head which has been designed for a thin substrate cannot be used for an optical disc of a thick substrate. The reasons will now be described hereinbelow. The objective lens for an optical disc has been designed so as to set off a spherical aberration which occurs when the converged beam passes in the disc substrate. Since such an aberration is corrected in accordance with the thickness or the disc substrate, the aberration correction is not accurately performed for the converged beam which passes through the disc substrate having a thickness different from the design value. The above point will now be explained with reference to the drawing. FIGS. 18A and 18B are schematic side elevational views for explaining a situation of the occurrence of the aberration due to the disc substrates having different thicknesses. FIG. 18A is a diagram in the case of using an objective lens which has been designed for a thin disc substrate and shows traces of lights in a state in which a beam has been converged through the disc substrate having the same thickness as the design value. In the diagram, a broken line indicates the surface of a recording layer and all of the lights emitted from the objective lens are converged to one point 0 on the recording layer surface. FIG. 18B is a diagram in the case of using an objective lens which has been designed for the same thin disc substrate as that of FIG. 18A and shows traces of lights in a state in which the beam has been converged through the disc substrate having a thickness which is thicker than the design value. In FIG. 18B, the lights emitted from the outer-most peripheral portion of the objective lens are converged to a point O' on the recording layer surface. However, the light locating near the optical axis is converged at the front side. Such a phenomenon is called a spherical aberration. *Whenever the term "aberration" is used hereinafter, it means spherical aberration.* When such an aberration occurs, the objective lens cannot converge the light beam until what is called a diffraction limit. Therefore, in the case of using the objective lens whose aberration has been corrected for a thin disc substrate, an information signal cannot be recorded, reproduced, or erased onto/from an optical disc having a thick disc substrate. Similarly, in the case of using the objective lens whose aberration has been corrected for a thick disc substrate, in information signal cannot be recorded, reproduced, or erased onto/from an optical disc having a thin disc substrate.

SUMMARY OF THE INVENTION

In consideration of the above drawbacks, it is an object of the invention to provide an optical disc apparatus which can record, reproduce, or erase information signals onto/from a plurality of optical discs in which thicknesses of disc substrates are different.

To accomplish the above object, according to the invention, there is provided an optical disc apparatus for recording, reproducing, or erasing information signals onto/from an optical disc by converging light fluxes onto a recording layer through a transparent disc substrate, comprising: N converging means whose aberrations have been corrected for N ($N \geqq 2$) disc substrates having different thicknesses, respectively; disc discriminating means for discriminating the thickness of the disc substrate of the optical disc which has been loaded and for generating a discrimination signal according to the result of the discrimination; and control means for selecting one of the converging means in which the occurrence of the aberration due to the disc substrate is smallest in accordance with the discrimination signal.

DESCRIPTION OF THE PREFERRED EMBODIMENT

Embodiments of the invention will be described hereinbelow on the assumption that thicknesses of disc substrates are set to two kinds of thicknesses.

Figure 1:
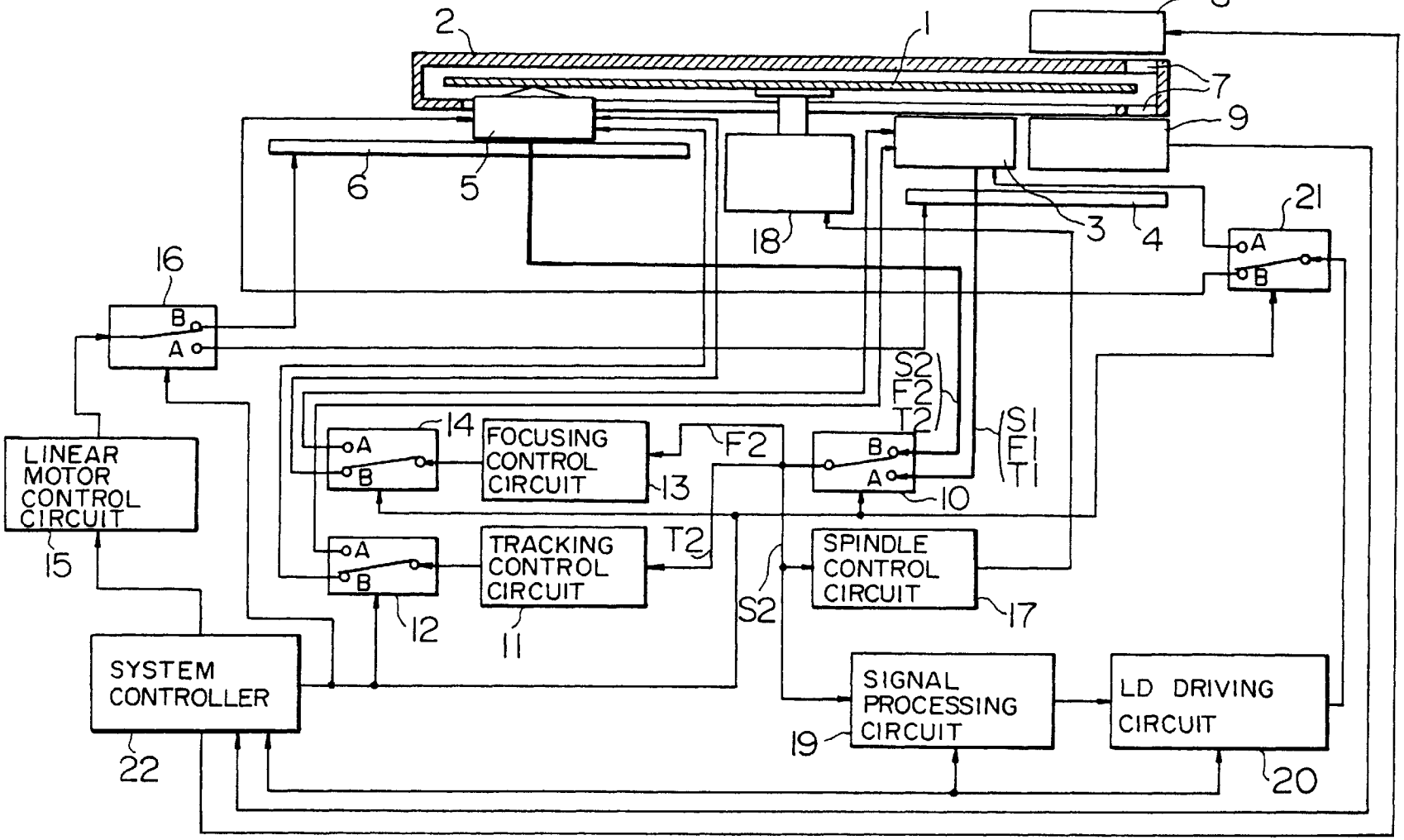
FIG. 1 is a constructional diagram of an optical disc apparatus according to the first embodiment of the invention.
Figure 2:
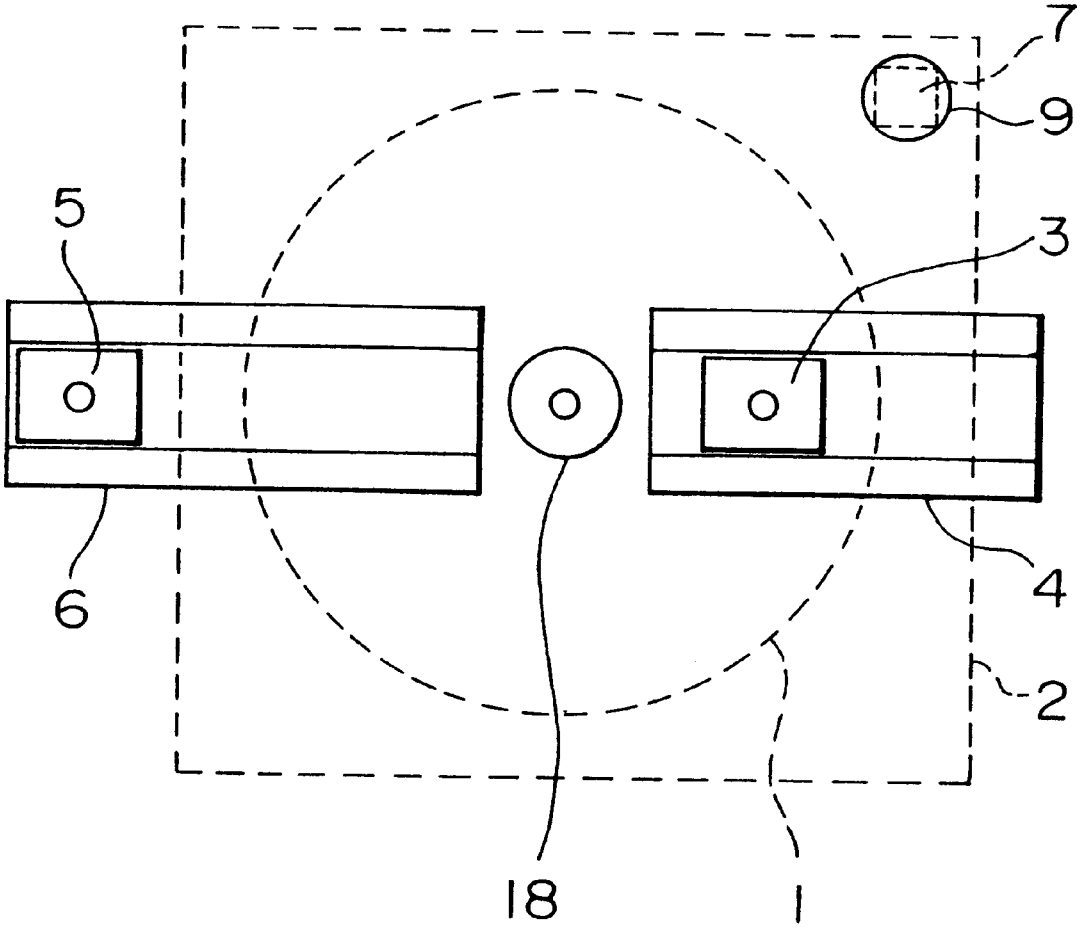
FIG. 2 is a plan view showing an arrangement of a main section of the optical disc apparatus in the first embodiment.
Figure 3A:
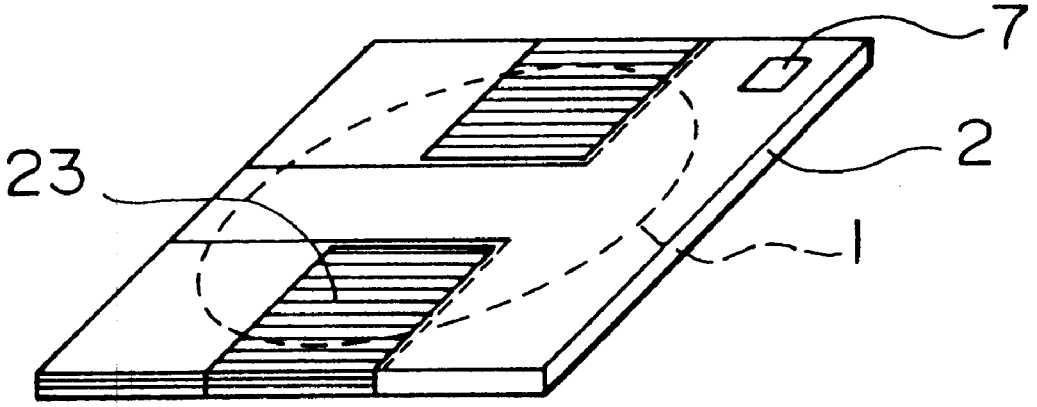
FIGS. 3A and 3B are perspective views of cartridges of optical discs in the first embodiment.
Figure 3B:
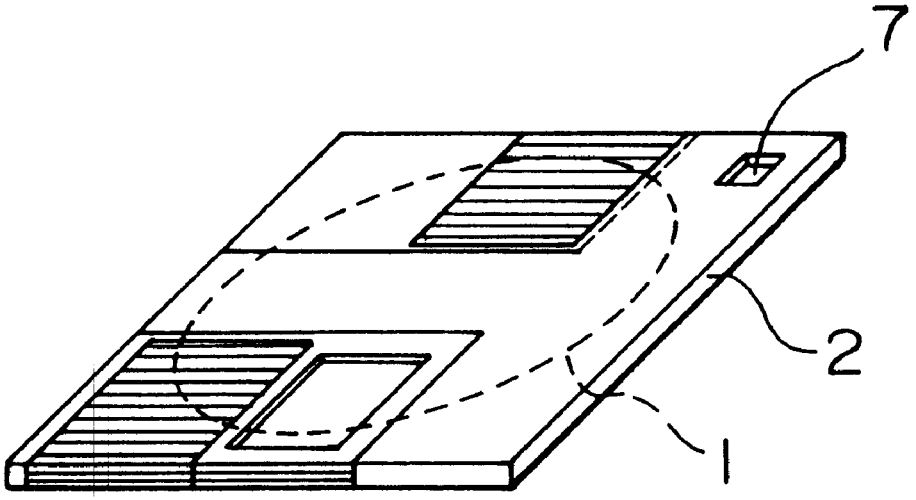

FIG. 1 is a constructional diagram of an optical disc apparatus in the first embodiment of the invention. FIG. 2 is a plan view showing an arrangement of a main section of the embodiment FIGS. 3A and 3B are perspective views of cartridges of optical discs in the embodiment.

In FIGS. 1 to 3A and 3B, reference numeral 1 denotes a first or second optical disc. Thicknesses of disc substrates of both of the first and second optical discs are different. Reference numeral 2 denotes a cartridge which encloses the optical disc 1 and protects. The cartridge 1 is made of plastics or the like. Reference numeral 3 denotes a first optical head and 5 indicates a second optical head. Each of the optical heads is constructed by a converging optical system comprising: an objective lens; a semiconductor laser, a photo detector; a beam splitter; and the like (all of the above components are not shown). Each of the optical head detects an information signal, a focusing error signal, and a tracking error signal which have been recorded on the optical disc 1 on the basis of an intensity or an intensity distribution of the reflected lights of a laser beam irradiated onto the optical disc 1 and generates a photo detection signal to the outside. An information signal is recorded onto or erased from the optical disc 1 by modulating an intensity of the laser beam. Both of the optical heads have bases to hold the above optical devices and actuators. A reproduction information signal, a focusing error signal, and a tracking error signal which arc generated from the photo detector of the first optical head 3 are expressed by $S_1$, $F_1$, and $T_1$, respectively. Similar signals which are generated from the photo detector of the second optical disc 5 are also expressed by $S_2$, $F_2$, and $T_S$, respectively. Reference numeral 4 denotes a first linear motor which is arranged below the optical disc 1 and moves the first optical head 3 in the radial direction of the disc in parallel with the disc surface. Reference numeral 6 denotes a second linear motor which is arranged below the optical disc 1 so as to face the first linear motor 4 and moves the second optical head 5 in a manner similar to the first optical head 3.

As shown in FIG. 2, the second linear motor 6 is extended until the further outside of the outermost peripheral portion of the optical disc 1. Therefore, when the second optical head 5 moves to the outermost side, the optical head 5 is projected from the lower surface of the optical disc. Reference numeral 7 denotes a discrimination hole formed on the surface of the cartridge 2.

The cartridge in the embodiment will now be described with reference to FIGS. 3A and 3B. The discrimination hole 7 is closed in the case where the optical disc 1 enclosed in the cartridge is the first optical disc shown in FIG. 3A and is open in the case where it is the second optical disc shown in FIG. 3B. Reference numeral 23 denotes a slide shutter. Since the optical disc apparatus of the embodiment has two optical heads, two slide shutters are provided. When the cartridges are removed from the optical disc apparatus, the slide shutters are closed to protect the internal discs from dusts.

Reference numeral 8 denotes a light emitting diode (hereinafter, abbreviated to an LED) which is arranged so as to be located over the discrimination hole 7 when the cartridge 2 has been loaded into the optical disc apparatus of the embodiment. Reference numeral 9 denotes a photo diode arranged at a position so as to face the LED 8 through the cartridge 2. The photo diode 9 generates a detection signal to a system controller 22, which will be explained hereinlater. Reference numeral 10 denotes a first selector for selecting either one of the first group of photo detection signals ($S_1$, $F_1$, and $T_1$) or the first optical head 3 and the second group of photo detection signals ($S_2$, $F_2$, and $T_2$) of the second optical head 5 and for outputting the selected signals. Reference numeral 11 denotes a tracking control circuit which receives the tracking error signal $T_1$ or $T_2$ from among the output signals of the first selector 10 and generates a tracking actuator driving signal to a second selector 12, which will be explained hereinlater. Further, reference numeral 12 denotes the second selector to select either an actuator of the first optical head 3 or an actuator of the second optical head 5 as a destination to which the tracking actuator driving signal is supplied. Reference numeral 13 denotes a focusing control circuit which receives the focusing error signal $F_1$ or $F_2$ from among the signals which are generated from the first selector 10 and generates a focusing actuator driving signal to a third selector 14, which will be explained hereinlater. Further, reference numeral 14 denotes the third selector for selecting either the actuator of the first optical head 3 or the actuator of the second optical head 5 as a destination to which the focusing actuator driving signal is supplied. Reference numeral 15 denotes a linear motor control circuit which supplies a driving signal to a fourth selector 16, which will be explained hereinlater, by a control signal which is supplied from the system controller 22, which will be described hereinlater. Reference numeral 16 denotes the fourth selector to select either the first linear motor 4 or the second linear motor 6 as an output destination of the driving signal supplied from the linear motor control circuit 15. Reference numeral 17 denotes a spindle control circuit which receives the reproduction information signal $S_1$ or $S_2$ and generates a control current to a spindle motor 18, which will be explained hereinlater. Reference numeral 18 denotes the spindle motor to rotate the optical disc 1. Reference numeral 19 denotes a signal processing circuit for executing signal processes such as demodulation and/or decoding or the like to the input signal $S_l$ or $S_2$, for converting into an audio signal or the like, or for outputting the information signal to be recorded onto the optical disc 1 to an LD driving circuit 20, which will be explained hereinlater. Reference numeral 20 denotes the LD driving circuit to supply a driving current for allowing laser beams to be emitted from the semiconductor lasers of both of the optical heads to a fifth selector 21, which will be explained hereinlater. Reference numeral 21 denotes the fifth selector to switch the output destination of the above driving current to either one of the first and second optical heads 3 and 5 in accordance with a control signal from the system controller 22, which will be explained hereinlater. The system controller 22 generates the driving current for allowing the LED 8 to emit the light and receives the detection signal from the photo diode 9 and generates control signals to the first to fifth selectors 10, 12, 14, 16, and 21. The system controller 22 also generates control signals to the linear motor control circuit 13 and the signal processing circuit 19. In FIG. 1, switching terminals in the first to fifth selectors 10, 12, 14, 16 and 21 on the first head side are designated by "A" and those on the second head side are designated by "B" in the diagram.

Figure 4A:
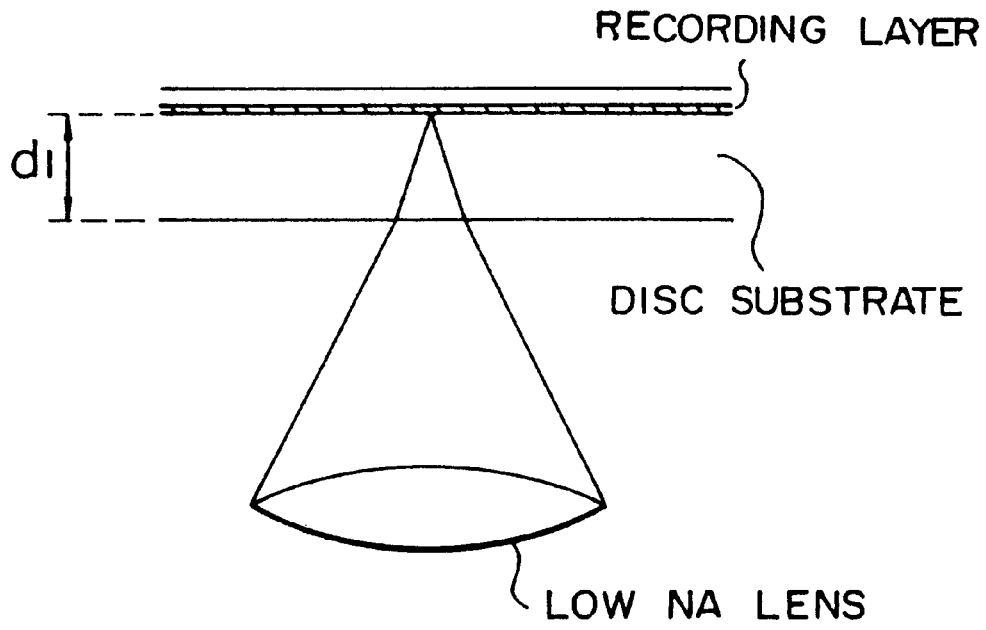
FIGS. 4A and 4B are schematic diagrams showing cross sections of the optical discs and states of convergences by objective lenses in the first embodiment.
Figure 4B:
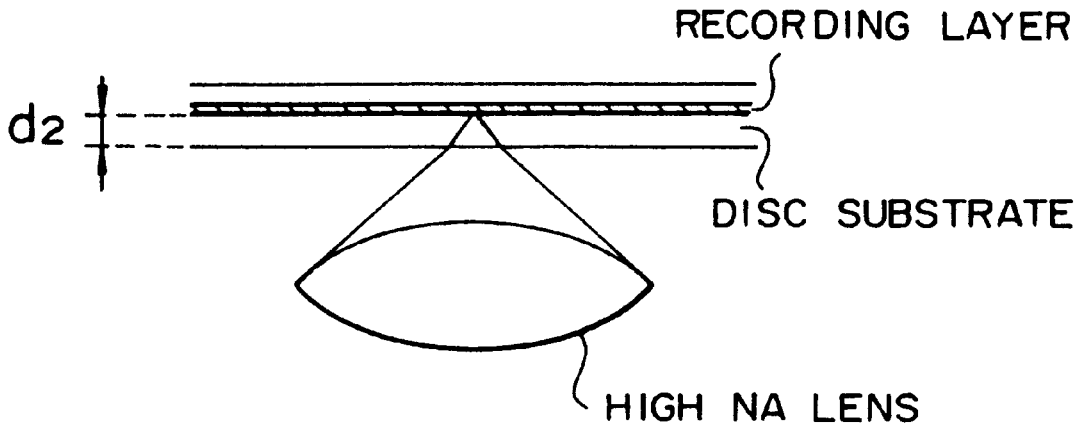

The first optical disc is a CD or an optical disc having a recording density similar to that of the CD and a thickness of the disc substrate is set to $d_1$ as shown in FIG. 4A. For instance, assuming that the optical disc shown in FIG. 4A is a CD, $d_1$=1.2 mm. The second optical disc is an optical disc which can execute a recording at a higher density thin that of the first optical disc and a thickness of the disc substrate assumes $d_2$ as shown in FIG. 4B. To reduce the aberration of the converged spot due to a tilt error, the thickness $d_2$ of the second optical disc is designed so as to be smaller than $d_1$. For example, $d_2$=0.3 mm.

The first optical head 3 has, for instance, a semiconductor laser of a wavelength of 780 nm and an objective lens or an NA or 0.45, so that the laser beam can be converged to a spot diameter $\phi$ or about 2.1 $\mu$m. In addition, an optical design of the objective lens has been made so as to correct the aberration by the disc substrate of the thickness $d_1$. The second optical head 5 has, for instance, the same semiconductor laser as that of the first optical head and an objective lens of an NA of 0.8, so that the laser beam can be converged until a spot diameter of 1.2 $\mu$m. Moreover, an optical design of the objective lens has been made so as to correct the aberration by the disc substrate of the thickness $d_2$.

*In FIGS. 4A and 4B, respective focal distances FD and workinig distances WD are shown.*

The operation of the optical disc apparatus of the embodiment constructed as mentioned above will now be described hereinbelow.

First, the case where the cartridge 2 enclosing the second optical disc has been loaded into the optical disc apparatus of the embodiment will be described. When the cartridge 2 is loaded, the LED 8 emits the light and the photo diode 9 detects the presence or absence of a transmission light which passes through the discrimination hole 7. As already described in conjunction with FIGS. 3A and 3B, since the discrimination hole 7 is open in the case of the second optical disc, the photo diode 9 detects the transmission light and generates a detection signal to the controller 22. The controller 22 determines that the disc in the loaded cartridge 2 is the second optical disc, so that the controller 22 supplies control signals to the first to fifth selectors 10, 12, 14, 16, and 21 so as to select the terminals B on the second optical head side. Thus, the semiconductor laser of the second optical head 5 is selected as in output destination of the driving current which is supplied from the LD driving circuit 20. The photo detector of the second optical head 5 is selected as an input destination of the tracking control circuit 11, focusing control circuit 13, spindle control circuit 17, and signal processing circuit 19. The actuator of the second optical head 5 is selected as an output destination of the actuator driving signals of the tracking control circuit 11 and focusing control circuit 13. The second linear motor 6 is selected as an output destination of the driving current of the linear motor control circuit 15.

Therefore, the second optical head 5 irradiates the laser beam and converges onto an information track on the optical disc 1 without an aberration. Simultaneously, the second optical head 5 detects the reflected lights from the disc and generates the information signal $S_2$, focusing error signal $F_2$, and tracking error signal $T_2$. Those signals are supplied through the first selector 10 to the respective circuits. That is, the signal $S_2$ is supplied to the spindle control circuit 17 and signal processing circuit 19. The signal $F_2$ is supplied to the focusing control circuit 13. The signal $T_2$ is supplied to the tracking control circuit 11. The tracking control circuit 11 produces the tracking actuator driving signal in accordance with the signal $T_2$ and supplies to the actuator of the second optical head 5 through the second selector 12, thereby eliminating the tracking error. In a manner similar to the above, the focusing control circuit 13 also produces the focusing actuator driving signal in accordance with the signal $F_2$ and supplies to the actuator of the second optical head 5 through the third selector 14, thereby eliminating the focusing error. The linear motor control circuit 15 generates the driving current to the linear motor 6 in response to the control signal from the system controller 22, thereby moving the second optical head 5 in the inner or outer rim direction of the optical disc 1. The spindle control circuit 17 extracts a clock component from the information signal $S_2$ and controls the spindle motor 18, thereby rotating the optical disc 1 at a constant linear velocity (CLV) or a constant angular velocity (CAV) or the like. The signal processing circuit 19 executes signal processes such as demodulation, decoding, and the like to the information signal $S_2$ in the reproducing mode and generates to the outside as audio or video signals or the like. On the other hand, the signal processing circuit 19 executes signal processes such as encoding, modulation, and the like to the audio or video signals or the like which have been supplied from the outside in the recording mode and generates to the LD driving circuit 20 as a recording signal. Until the cartridge 2 is loaded, the second optical head 5 records or reproduces the information signal onto/from the second optical disc 1.

On the other hand, in the case where the cartridge 2 enclosing the first optical disc has been loaded into the optical disc apparatus of the embodiment, since the discrimination hole 7 is closed, the photo diode 9 doesn't detect the transmission light. Therefore, the system controller 22 determines that the disc in the cartridge 2 is the foregoing first optical disc. Thus, the controller 22 generates control signals to the first to fifth selectors 10, 12, 14, 16, and 21 so as to select the terminals A on the first optical bead side. Therefore, the semiconductor laser of the first optical head 3 is selected as an output destination of the driving current which is supplied from the LD driving circuit 20. The photo detector of the first optical head 3 is selected as an input destination of the tracking control circuit 11, focusing control circuit 13, spindle control circuit 17, and signal processing circuit 19. The actuator of the first optical head 3 is selected as an output destination of the actuator driving signals of the tracking control circuit 11 and focusing control circuit 13. The first linear motor 4 is selected as an output destination of the driving current of the linear motor control circuit 17. Therefore, the first optical head 3 irradiates the laser beam and converges onto the information track on the optical disc 1 without an aberration. Simultaneously, the reflected lights from the disc are detected and generated as the information signal $S_1$, focusing error signal $F_1$, and tracking error signal $T_1$. The above signals are supplied through the first selectors 10 to the respective circuits That is, the signal $S_1$ is supplied to the spindle control circuit 17 and signal processing circuit 19. The signal $F_1$ is supplied to the focusing control circuit 13. The signal $T_1$ is supplied to the tracking error detecting circuit 11. The subsequent operations are similar to those in the case of the second optical disc mentioned above.

In the case where the objective lens of the second optical head is a lens of a high NA and a short operating distance, it is necessary to set an interval between the second optical head 5 and the surface of the optical disc 1 to be fairly narrower than that in the case of the first optical head 5. Therefore, while the first optical disc is loaded, the controller 22 controls the second linear motor 6, thereby moving the second optical head 5 to the outside of the disc surface as shown in FIG. 2. Due to this, it is possible to prevent that the objective lens of the second optical head 5 collides with the optical disc 1 due to a surface oscillation.

As described above, according to the embodiment, by providing the first optical head 3 and second optical head 5 having convergence optical systems corresponding to the thicknesses of the disc substrate of the first and second optical discs, the signal can be preferably recorded, reproduced, or erased by the optical head suitable for the thickness of each disc substrate. Moreover, by providing the discrimination hole 7 formed on the cartridge 2 and the disc discriminating means comprising the LED 8 to detect the opening/closure of the discrimination hole 7 and the photo diode 9, merely by loading the cartridge 2, each of the optical heads can be automatically accurately selected.

Figure 5:
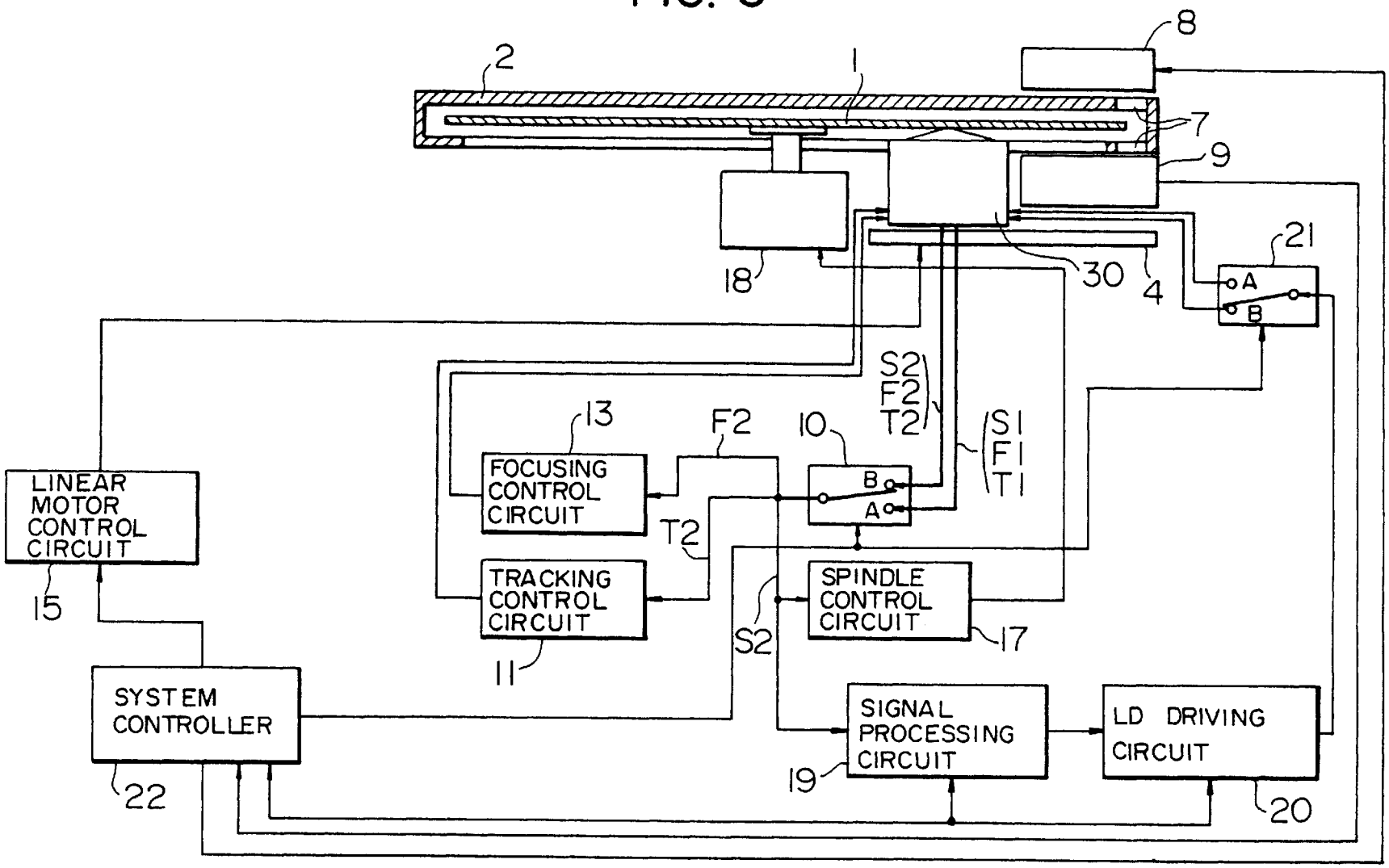
FIG. 5 is a constructional diagram of an optical disc apparatus according to the second embodiment of the invention.

FIG. 5 shows a constructional diagram of an optical disc apparatus according to the second embodiment of the invention. In the diagram, the second embodiment differs from the foregoing first embodiment with respect to a point that a third optical head 30 is arranged in place of the first and second optical heads 3 and 5 and a point that the second, third, and fourth selectors 12, 14, and 16 are omitted. That is, the tracking actuator driving current which is generated from the tracking control circuit 11 and the focusing actuator driving current which is generated from the focusing control circuit 13 are directly supplied to the third optical head 30. The driving current which is generated from the linear motor control circuit 15 is directly supplied to the first linear motor 4.

Figure 6:
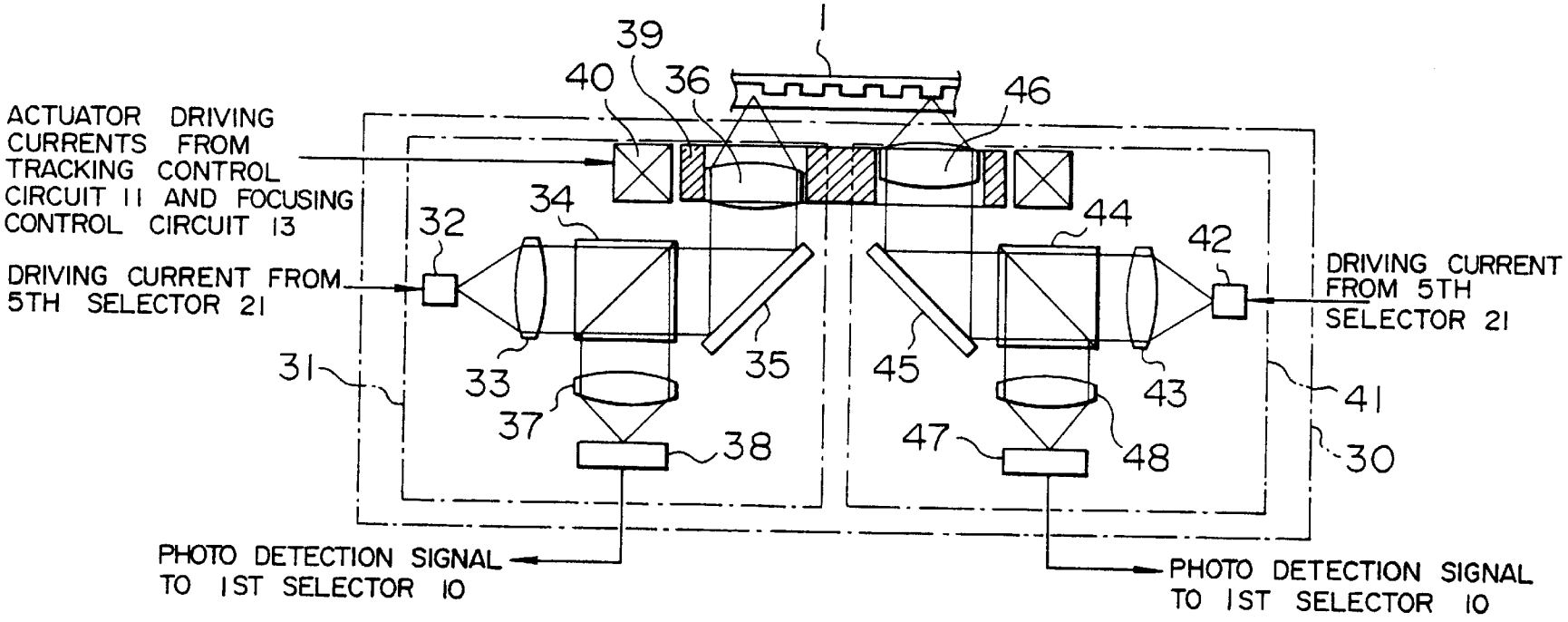
FIG. 6 is a detailed constructional diagram of optical heads in the second embodiment.

Further, FIG. 6 shows a detailed constructional diagram of the third optical head 30 in the second embodiment of the invention. In the diagram, reference numeral 1 denotes the first or second optical disc; 32 a first semiconductor laser as a light source; 33 a first collimating lens for converting a laser beam from the first semiconductor laser 32 into a parallel beam; 34 first beam splitter to divide the beam into two beams; 35 a first mirror to change the direction of the beam; 36 a first objective lens to converge the beam onto the optical disc 1; 37 a first detecting lens to converge the reflected lights which have been divided by the beam splitter 34; and 38 a first photo detector to obtain an information reproduction signal, a focusing error signal, and a tracking error signal from the converged reflected lights. The above components 32 to 38 construct a first converging optical system 31.

Reference numeral 39 denotes a lens holder to hold the first objective lens 36 and a second objective lens 46, which will be explained hereinlater. Reference numeral 40 denotes an actuator to support the lens holder 39. The driving currents are supplied from the tracking control circuit 11 and focusing control circuit 13 to the actuator 40.

Reference numeral 42 denotes a second semiconductor laser as a light source; 43 a second collimating lens to convert a laser beam from the second semiconductor laser 42 into a parallel beam; 44 a second beam splitter to divide the beam into two beams; 45 second mirror to change the direction of the beam; 46 the second objective lens to converge the beam onto the optical disc 1; 47 a second detecting lens to converge the reflected lights which have been divided by the second beam splitter 44; and 48 a second photo detector to obtain the information reproduction signal, focusing error signal, and tracking error signal from the converged reflected lights. The above components 42 to 48 construct a second converging optical system 41. The above first converging optical system 31, the second converging optical system 41, and the actuator 40 are mounted on a same base member (not shown) and construct the third optical head 30. The base member is ordinarily made of aluminum or the like and is attached to the first linear motor 4.

In a manner similar to the case which has been described in the first embodiment of the invention, for instance, the first objective lens 36 is designed so that NA=0.45 and the aberration by the disc substrate of a thickness $d_1$ is corrected. The second objective lens 46 is designed so that, for instance, NA=0.8 and the aberration by the disc substrate of a thickness $d_2$ is corrected.

The operation of the optical disc apparatus of the embodiment constructed as mentioned above will now be described hereinbelow. First, the case of the second optical disc will be explained. When the cartridge 2 is loaded into the optical disc apparatus of the embodiment, the LED 8 emits the light and the photo diode 9 detects the presence or absence of the transmission light which passes through the discrimination hole 7. If the transmission light has been detected, the system controller 22 determines that the disc in the loaded cartridge 2 is the second optical disc, so that the controller 22 selects the second converging optical system 41 of the third optical head 30. That is, the system controller 22 generates control signals to the first and fifth selectors 10 and 21 so as to make the second semiconductor laser 42 and the second photo detector 48 operative. The laser beam emitted from the second semiconductor laser 42 is converted into the parallel beam by the second collimating lens 43. The parallel beam is converged onto the second optical disc 1 by the second objective lens 46 through the second beam splitter 44 and the second mirror 45. The laser beam reflected by the disc is again converted into the parallel beam by the second objective lens 46 and is separated from the optical axis by the second beam splitter 44 through the second mirror 45 and is converged onto the second photo detector 48 by the second detecting lens 47.

The second photo detector 48 produces the information signal, focusing error signal, and tracking error signal from the converged reflected light from the disc and supplies to the first selector 10. The actuator 40 finely moves the lens holder 39 in the tracking and focusing directions by the driving currents from the tracking control circuit 11 and the focusing control circuit 13, thereby accurately converging the laser beam onto an information track on the optical disc 1.

Since the operations of the first linear motor 4, first selector 10, tracking control circuit 11, focusing control circuit 13, linear motor control circuit 15, spindle control circuit 17, spindle motor 18, signal processing circuit 19, LD driving circuit 20, fifth selector 21, and system controller 22 are substantially the same as the optical disc apparatus of the first embodiment mentioned above, their descriptions are omitted here.

On the other hand, in the case of the first optical disc, since the photo diode 9 doesn't detect the transmission light, the system controller 22 decides that the disc in the loaded cartridge 2 is the first optical disc mentioned above, so that the controller 22 selects the first converging optical system 31 of the third optical head 30. That is, the system controller 22 generates control signals to the first and fifth selectors 10 and 21 so as to make the first semiconductor laser 32 and the first photo detector 38 operative. The operation of the first converging optical system 31 is substantially the same as that of the second converging optical system 41 mentioned above. Until the cartridge 2 is unloaded, the recording, reproduction, or erasure of the information signal onto/from the first optical disc is executed by the first converging optical system 31.

As described above, according to the second embodiment, in addition to the effect by the first embodiment, since the first converging optical system 31 and the second converging optical system 41 are mounted on the same base and construct the third optical head 30, the linear motor can be commonly used as a single part and the number of parts can be reduced.

Figure 7:
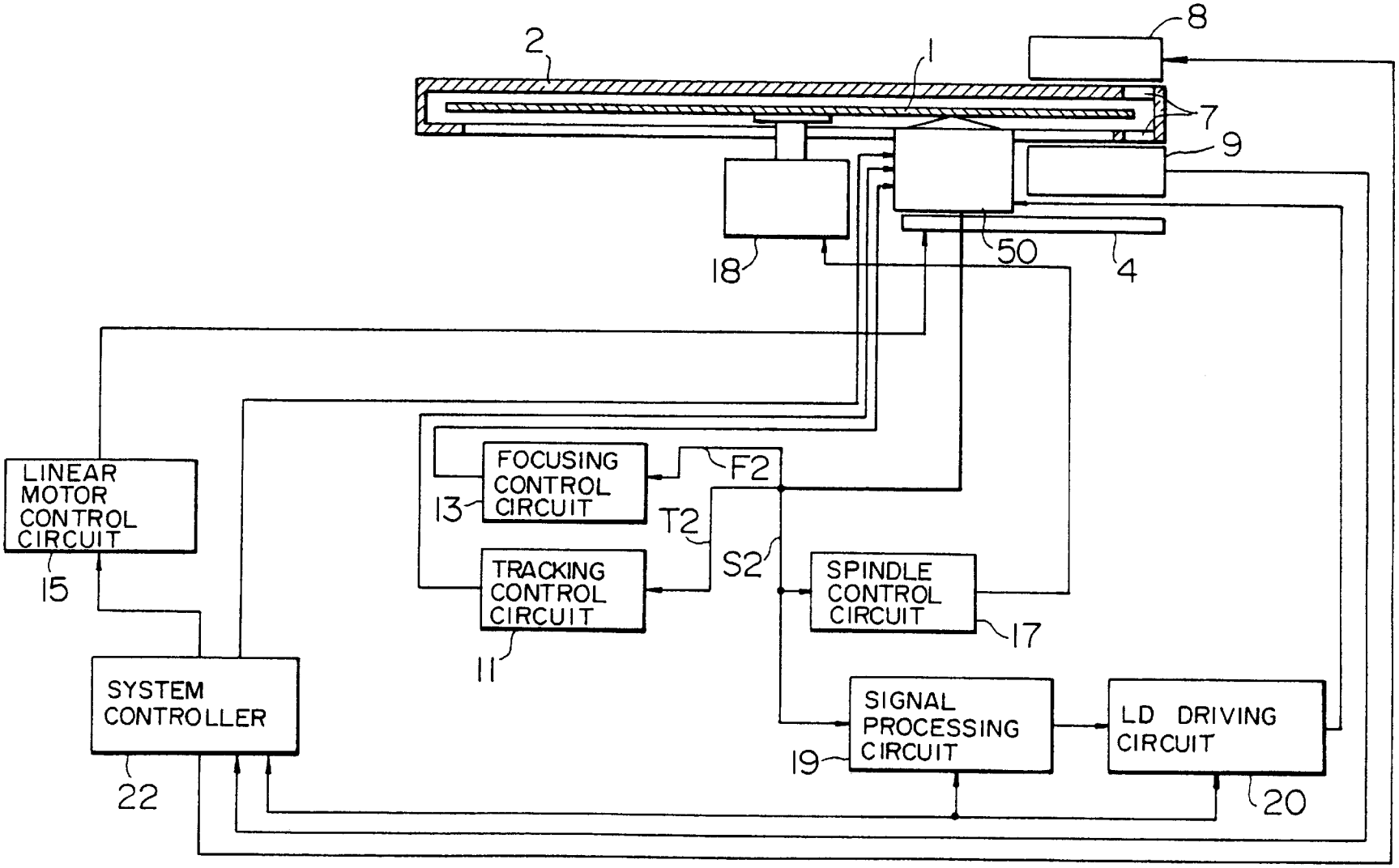
FIG. 7 is a constructional diagram of an optical disc apparatus according to the third embodiment of the invention.

FIG. 7 shows a constructional diagram of an optical disc apparatus according to the third embodiment of the invention. In the diagram, the third embodiment differs from the second embodiment with respect to a point that a fourth optical head 50 is arranged in place of the third optical head 30 and a point that the first selector 10 and the fifth selector 21 are omitted. That is, the photo detection signal which is generated from the fourth optical head 50 is directly supplied to the tracking control circuit 11, focusing control circuit 13, spindle control circuit 17, and signal processing circuit 19. The driving current which is generated from the LD driving circuit 20 is directly supplied to the fourth optical head 50.

Figure 8:
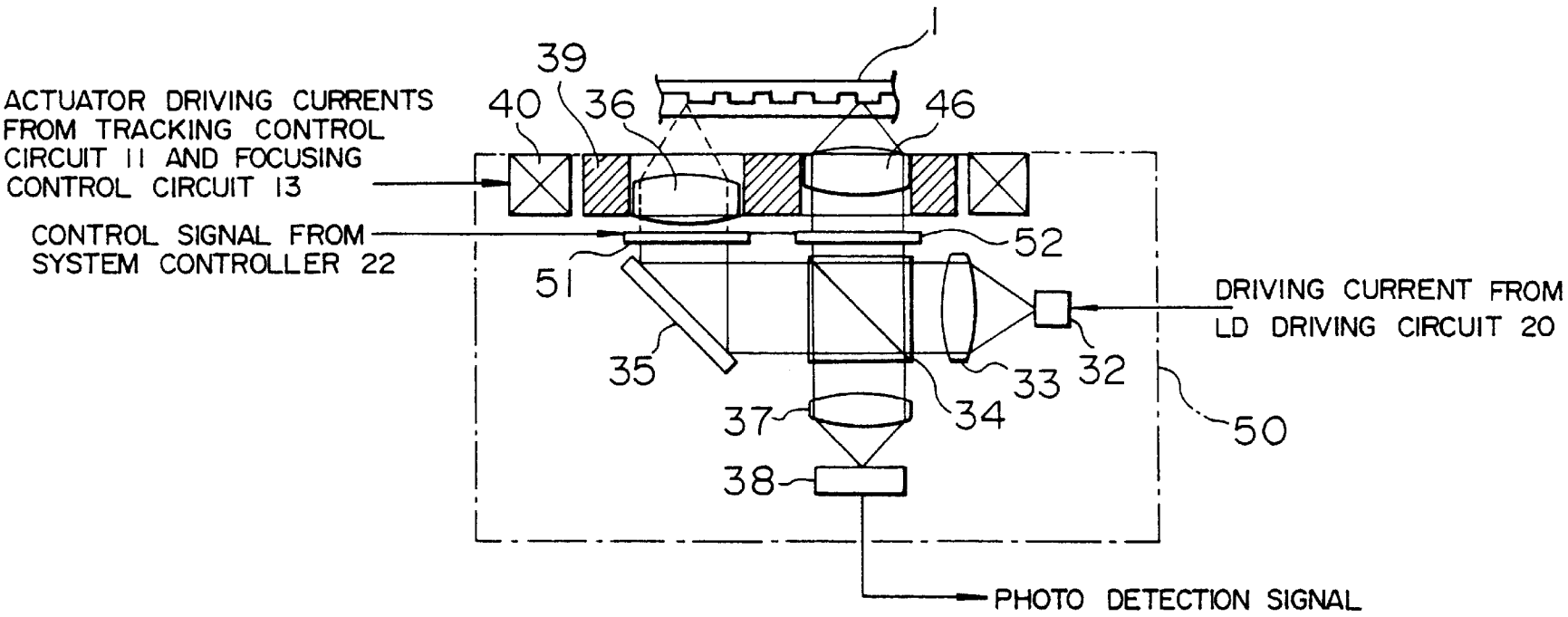
FIG. 8 is a detailed constructional diagram of an optical head in the third embodiment.

Further, FIG. 8 shows a detailed constructional diagram of the fourth optical head 50 in the third embodiment of the invention. In the diagram, reference numeral 1 denotes the first or second optical disc; 32 the first semiconductor laser as a light source; 33 the first collimating lens to convert the laser beam from the first semiconductor laser 32 into the parallel beam; 34 the first beam splitter to divide the laser beam into two beams; and 35 the first mirror to change the direction of the beam. The first objective lens 36 and the second objective lens 46 are the same as those mentioned in the second embodiment of the invention. The first objective lens 36 is arranged between the first mirror 35 and the optical disc 1. The second objective lens 46 is arranged between the first beam splitter 34 and the optical disc 1. Moreover, as mentioned in the foregoing embodiment, the aberration of the first objective lens 36 has been corrected in correspondence to the first optical disc having the disc substrate of the thickness $d_1$. The aberration of the second objective lens 46 has been corrected in correspondence to the second optical disc having the disc substrate of the thickness $d_2$. Reference numeral 51 denotes a first shutter arranged between the first objective lens 36 and the first mirror 35 and on the optical path which passes through the first objective lens 36. Reference numeral 52 denotes a second shutter which is arranged between the second objective lens 46 and the first beam splitter 34 and on the optical path which passes through the second objective lens 46. The first and second shutters 51 and 52 open or close the optical paths by control signals from the system controllers 22, respectively. Reference numeral 37 denotes the first detecting lens to converge the reflected lights which have been divided by the beam splitter 34. Reference numeral 38 denotes the first photo detector to obtain the information reproduction signal, focusing error signal, and tracking error signal from the converged reflected light.

Among the foregoing component elements, the first objective lens 36 constructs the first converging optical system mentioned in the second embodiment of the invention together with the first semiconductor laser 32, the first collimating lens 33, the first beam splitter 34, and the first mirror 35. The second objective lens 46 constructs the second converging optical system together with the first semiconductor laser 32, the first collimating lens 33, the first beam splitter 34, and the first mirror 35 which are commonly used for the first converging optical system. The first converging optical system is mounted onto a common base (not shown) together with the first and second shutters 5 and 52, thereby constructing the fourth optical head 50. Since the lens holder 39 and the actuator 40 have the same construction as those in the third optical head 30 in the second embodiment, their descriptions are omitted here. The fourth optical head 50 is attached to the first linear motor 4.

The operation of the optical disc apparatus in the embodiment with the above construction will now be described hereinbelow. The kind of optical disc is detected in a manner similar to the above. When the system controller 22 determines that the disc in the loaded cartridge 2 is the second optical disc, the controller 22 generates control signals to the first and second shutters 51 and 52 of the fourth optical head 50. When the control signals are supplied, the first shutter 51 is closed and the second shutter 52 is open. In the above state, the laser beam emitted from the first semiconductor laser 32 is converted into the parallel beam by the first collimating lens 33 and is divided into the transmission light and the reflected light by the first beam splitter 34. The transmission light is shut out by the first shutter 51 via the first mirror 35. Consequently, only the reflected light passes through the second shutter 52 and is converged onto the optical disc 1 by the second objective lens 46. The light reflected by the optical disc 1 is again converted into the parallel light by the second objective lens 46 and passes through the second shutter 52 and is reflected and separated by the first beam splitter 34 and is converged onto the first photo detector 38 by the first detecting lens 37. The first photo detector 38 generates the focusing error signal and tracking error signal from the converged reflected light of the disc and reproduces the information signal on the disc. The above operations are executed until the cartridge 2 is unloaded.

Since the operations of the first linear motor 4, tracking control circuit 11, focusing control circuit 13, linear motor control circuit 15, spindle control circuit 17, spindle motor 18, signal processing circuit 19, LD driving circuit 20, and system controller 22 are the same as those in the optical disc apparatus of the foregoing first embodiment, their descriptions are omitted here.

On the other hand, if the system controller 22 determines that the disc in the loaded cartridge 2 is the first optical disc, the first shutter 51 is opened and the second shutter 52 is closed. In the above state, in the transmission light and the reflected light by the first beam splitter 34, the reflected light is shut out by the second shutter 52 and only the transmission light passes through the first shutter 51 and is converged onto the optical disc 1 by the first objective lens 36. The other operations are executed in a manner similar to those in the case of the second optical disc.

As mentioned above, according to the third embodiment, in addition to the effects by the second embodiment, since the first and second shutters 51 and 52 are provided as light flux selecting means, the semiconductor laser, collimating lens, beam splitter, detecting lens, and photo detector in each of the converging optical system can be commonly used and the size and weight of the optical head can be reduced. Therefore, assuming that a driving force of the linear motor is the same, the improvement of the performance such as reduction of the seeking time and the lie can be realized.

Figure 9B:
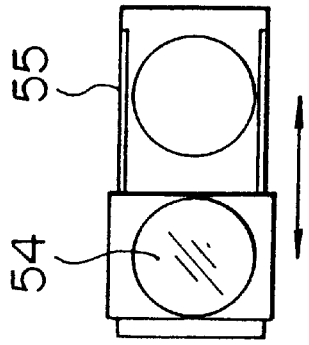
FIGS. 9A and 9B are a detailed constructional diagram of an optical head of an optical disc apparatus according to the fourth embodiment of the invention.
Figure 9A:
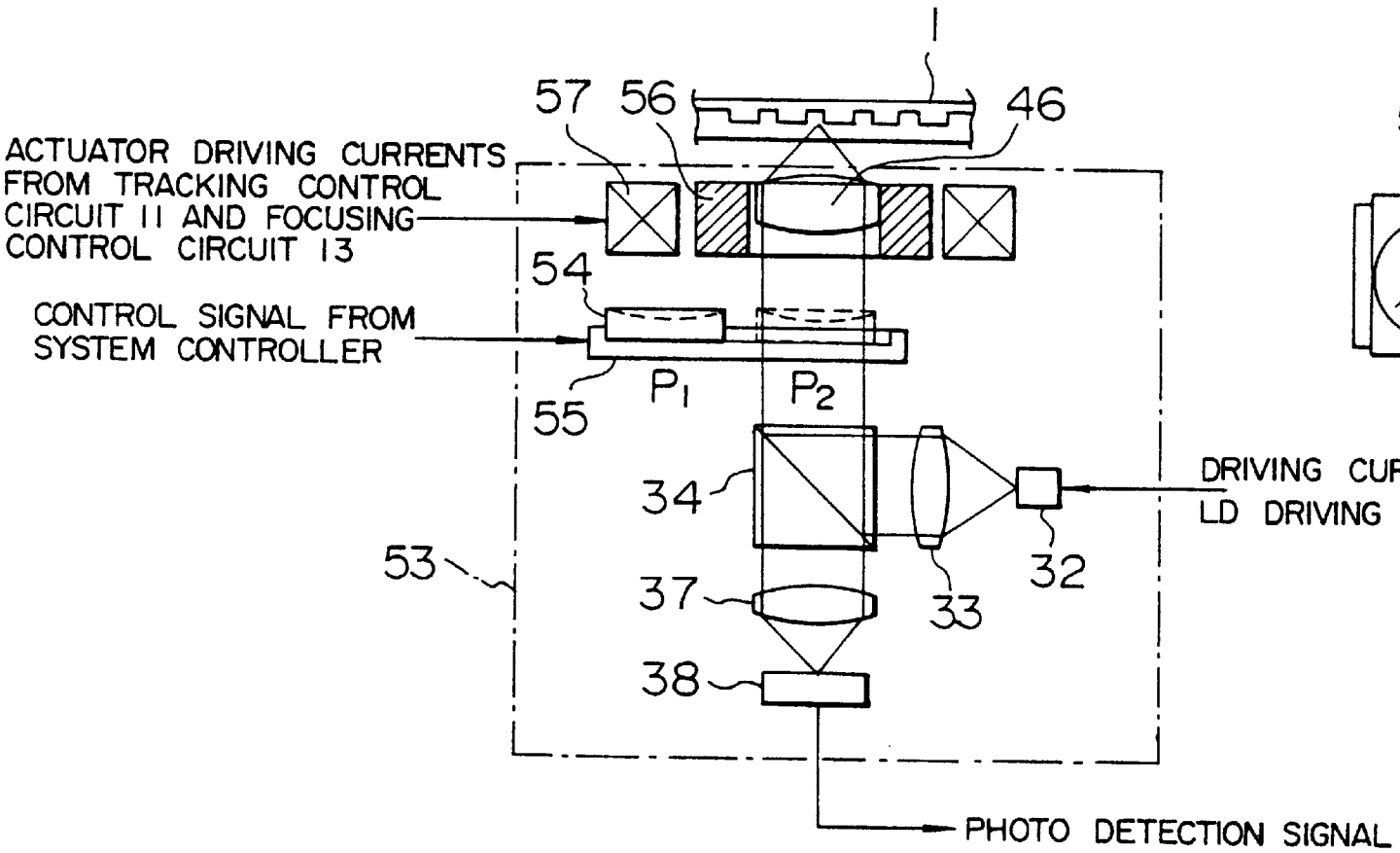

FIGS. 9A and 9B show a detailed constructional diagram of an optical head of an optical disc apparatus in the fourth embodiment of the invention. In FIG. 9A, since the optical disc 1, first semiconductor laser 32, first collimating lens 33, first beam splitter 34, second objective lens 46, first detecting lens 37, and first photo detector 38 are constructed in a manner similar to those in the foregoing fourth optical head 50, their descriptions are omitted here. Reference numeral 56 denotes a lens holder to hold the second objective lens 46; 57 an actuator to which the lens holder 56 is attached; 54 a wave front correcting lens attached to a slider 55, which will be explained hereinlater, so that the optical axis is in parallel with the optical axis of the second objective lens 46; and 55 the slider which supports the wave front correcting lens 54 and is arranged so as to transverse in the plane which is perpendicular to the light flux between the first beam splitter 34 and the second objective lens 46, thereby enabling the wave front correcting lens 54 to be moved in such a plane. Moreover, such a movable range is set to a position (shown by $P_1$ in the diagram) where the wave front correcting lens 54 is perfectly deviated out of the light flux or a position (shown by $P_2$ in the diagram) where the optical axis of the slider 55 coincides with the optical axis of the second objective lens 46. The above-mentioned component elements are attached to a base (not shown) and construct a fifth optical head 53.

FIG. 9B is a plan view when the wave front correcting lens 54 and the slider 55 are seen from the direction of the optical axis. In the diagram, the lens $S_4$ is movable in the directions shown by arrows. The wave front correcting lens 54 has been designed in a manner such that a synthetic optical system with the second objective lens 46 is identical to the foregoing first objective lens. That is, the lens 54 has been designed so as to correct the aberration by the disc substrate of the first optical disc. In the fifth optical head 53, the second objective lens 46 constructs the second converging optical system mentioned in the second embodiment of the invention together with the first semiconductor laser 32, first collimating lens 33, and first beam splitter 34 and can be also regarded such that they construct the first converging optical system by adding the wave front correcting lens 54 to the second converging optical system.

Since a whole construction of the optical disc apparatus in the fourth embodiment is substantially the same as that of the optical disc apparatus of the third embodiment shown in FIG. 7 mentioned above, its description is omitted here.

The operation of the optical disc apparatus in the fourth embodiment with the above construction will now be described hereinbelow with respect to only the fifth optical head 53. The kind of optical disc is detected in a manner similar to the above. If the system controller 22 determines that the disc in the loaded cartridge 2 is the second optical disc, the controller 22 generates a control signal to the slider 55. When the control signal is supplied, the slider 55 moves the wave front correcting lens 54 to the position $P_1$. The laser beam emitted from the first semiconductor laser 32 is converted into the parallel light by the first collimating lens 33 and is reflected by the first beam splitter 34 and is converged onto the optical disc 1 by the second objective lens 46. The light reflected by the optical disc 1 is again converted into the parallel light by the second objective lens 46. The parallel light passes through the first beam splitter 34 and is converged onto the first photo detector 38 by the first detecting lens 37. The first photo detector 38 generates a photo detection signal in a manner similar to the above. The above operations are executed until the optical disc 1 is unloaded.

On the other hand, if the system controller 22 decides that the disc in the loaded cartridge 2 is the first optical disc, the slider 55 moves the wave front correcting lens 54 to the position $P_2$. Thus, the laser beam emitted from the first semiconductor laser 32 passes through the wave front correcting lens 54 and the second objective lens 46 and is converged onto an information track on the optical disc 1 without an aberration. Thus, the operations similar to those in the case of the second optical disc are executed.

As mentioned above, according to the embodiment, in addition to the effects by the second embodiment, since the wave front correcting lens 54 serving as an aberration correcting means is held by the slider 55 and is movably arranged, the objective lens can be commonly used and a total mass which must be moved by the actuator 57 can be reduced. Thus, a burden to the driving force of the actuator can be reduced and a low electric power consumption can be accomplished.

The optical head 50 in the fourth embodiment has the second objective lens 46 corresponding to the optical disc having the disc substrate of the thickness $d_2$ and, further, corrects the aberration to the optical disc having the disc substrate of the thickness $d_1$ by the wave front correcting lens 54. However, an opposite construction can be also used. Namely, the above effect is also derived by a construction such that the first objective lens 36 corresponding to the optical disc of the disc substrate of the thickness $d_1$ is used in place of the second objective lens 46 and a wave front correcting lens which has been designed so as to correct the aberration due to the disc substrate of the thickness $d_2$ is provided.

Although the above three embodiments have been described with respect to the case where there are two kinds of thicknesses of the disc substrates, the invention, can be also applied to the case of three or more kinds of thicknesses of the disc substrates. In such a case, the number of optical elements such as objective lenses and the like is increased in accordance with the number of kinds of thicknesses of the disc substrates. With respect to the discriminating means of the optical disc, three or more kinds of optical discs can be discriminated by, for instance, checking a plurality of discrimination holes which are formed in the cartridge. For example, by forming n discriminating holes, $2^n$ kinds of optical discs can be discriminated.

Further, although the discrimination hole 7 formed on the cartridge 2, the LED 8, and the photo diode 9 have been used as disc discriminating means, paints of different reflectances can be also coated onto the surface of the cartridge 2 in place of the discrimination hole or a mechanical switch or the like can be also used in place of the LED and the photo diode.

Further, a difference between thicknesses of the disc substrates can be also directly discriminated by a reflected laser beam from the discs without using the cartridge. For example, in the case of the converging optical system corresponding to the thin disc substrate, a tracking error signal cannot be ordinarily obtained from an optical disc of a thick disc substrate due to a spherical aberration of the converging beam. Consequently, two optical discs having different thicknesses can be discriminated by checking the presence or absence of the tracking error signal. In such a case, there is an excellent effect such that the apparatus is simplified because there is no need to use the detecting means such as LED and photo diode and the like The optical head in each of the above-described optical disc apparatuses has been constructed by a conventional optical system using the objective lens made of a quartz glass or the like An optical head in each of optical disc apparatuses of embodiments, which will be explained hereinlater, differs from the above optical head and is constructed by forming an optical system onto a thin film waveguide.

Figure 10:
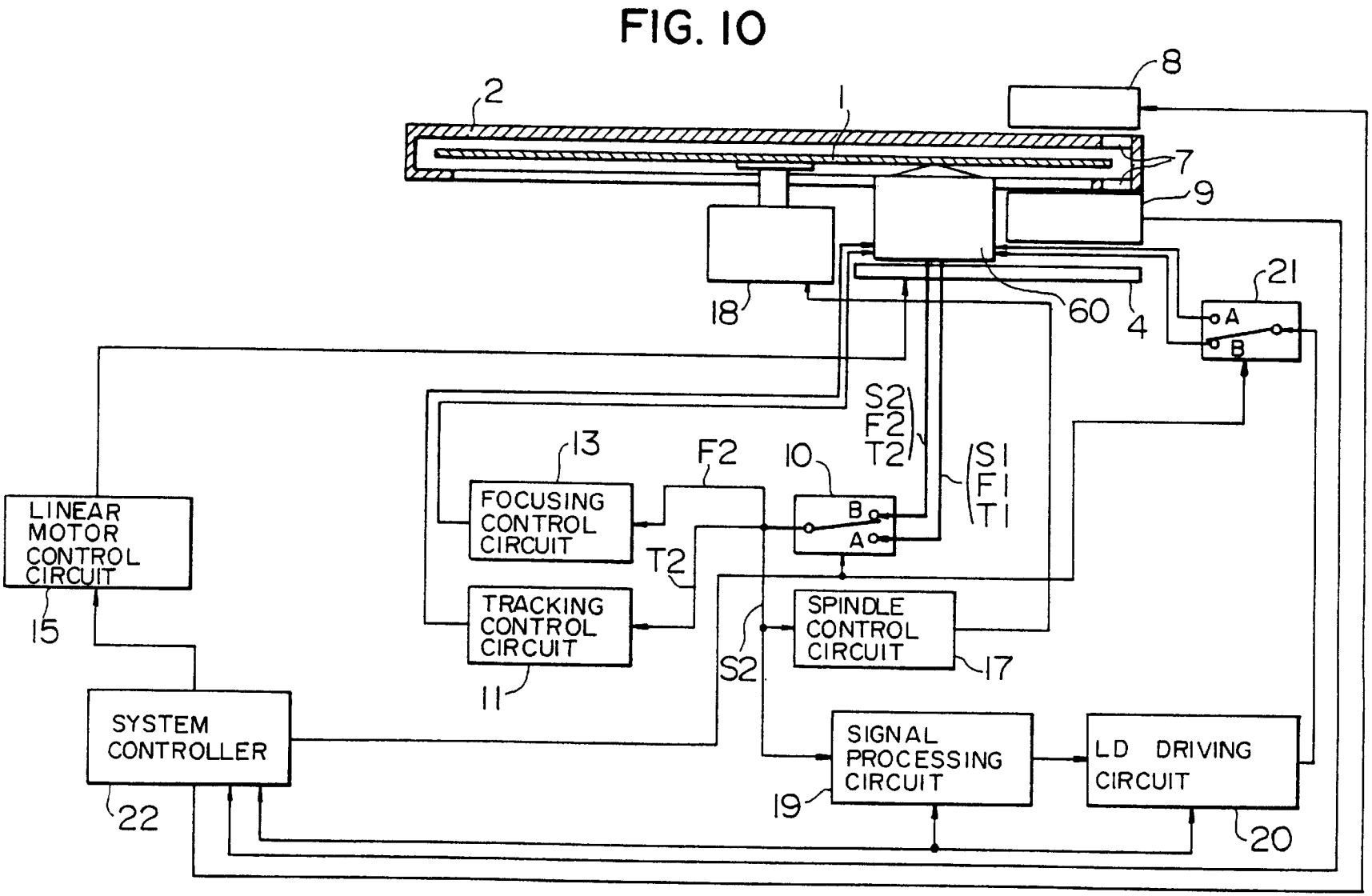
FIG. 10 is a cross sectional view showing optical discs whose substrate thicknesses are different and converging states by convergence grating couplers which have been designed in correspondence to the optical discs according to the fifth embodiment, respectively.
Figure 11:
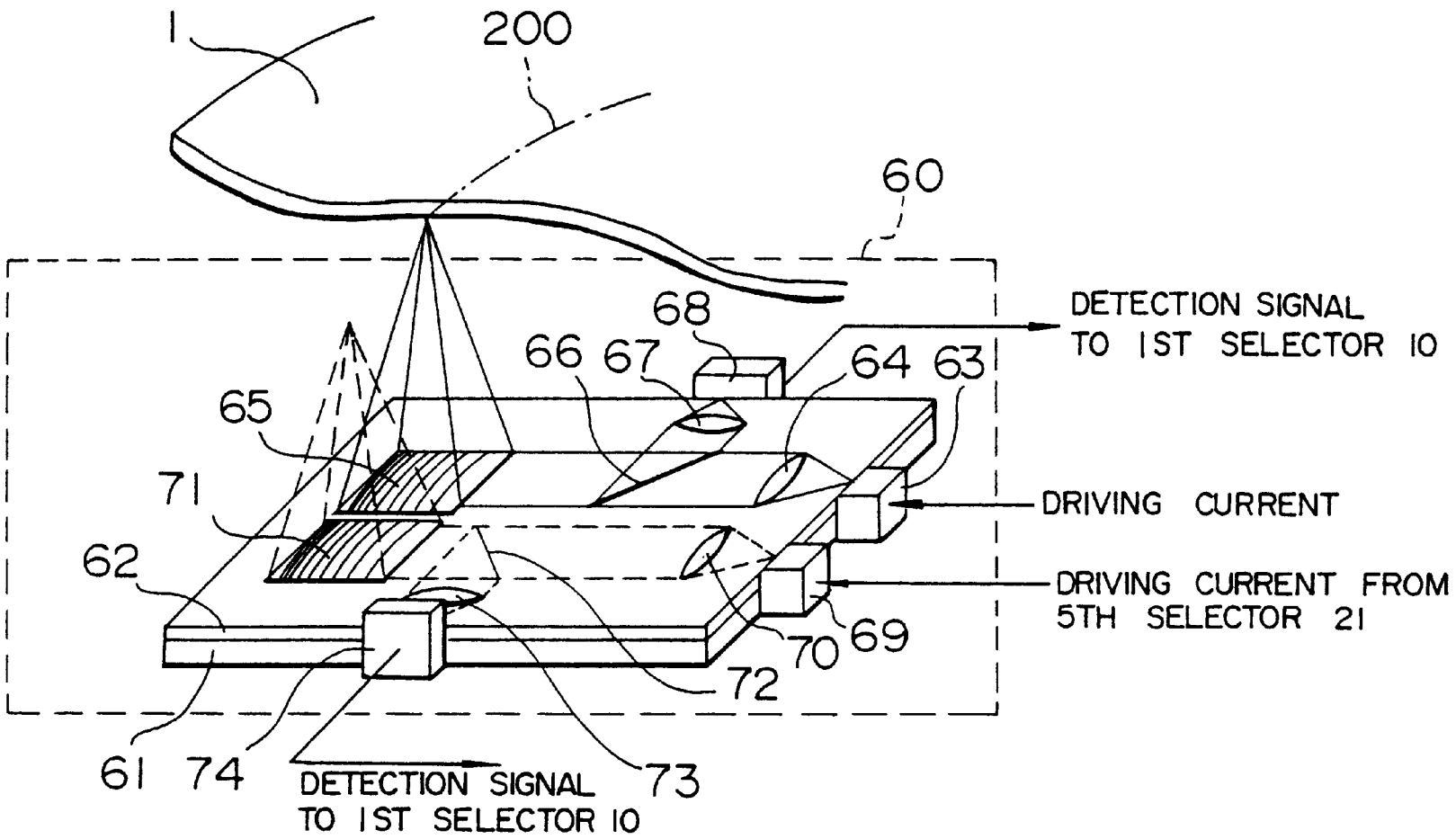
FIG. 11 is a schematic perspective view showing a construction of an optical head of an optical disc apparatus in the fifth embodiment.

FIG. 10 is a block diagram showing a construction of an optical disc apparatus according to the fifth embodiment of the invention. Further, FIG. 11 is a schematic perspective view showing a construction of an optical head of the optical disc apparatus in the fifth embodiment of the invention. Since a construction shown in FIG. 10 is substantially the same as that of the optical disc apparatus in the second embodiment of the invention shown in FIG. 5 except that a sixth optical head 60 is used, its description is omitted here. The sixth optical head 60 shown in FIG. 11 will now be described in detail hereinbelow.

In FIG. 11, reference numeral 1 denotes the same optical disc as that described in the foregoing embodiments. Reference numeral 200 denotes an information track formed on the optical disc 1. Reference numeral 61 denotes a substrate formed by $LiNbO_3$ or the like. The substrate 61 is attached to a head base through a focusing actuator and a tracking actuator and constructs the sixth optical head 60 together with them. Since the focusing actuator, tracking actuator, and head base which have conventionally been well known can be used as those components, their detailed description and the drawings are omitted here. Reference numeral 62 denotes an optical waveguide formed on the substrate 51 by Ti diffusion or the like; 63 a first semiconductor laser coupled to an edge surface of the optical waveguide 62; and 64 a first waveguide lens arranged on an optical path of the waveguide light which has been emitted from the first semiconductor laser 63 and entered the optical waveguide 61. For instance, a Fresnel lens formed by an electron beam lithography can be used as a lens 64. Reference numeral 65 denotes a first converging grating coupler formed on the optical path of the parallel waveguide light. The coupler 65 emits the waveguide light to a position out of the optical waveguide 62 and converges onto the optical disc 1. The first converging grating coupler 65 is a grating having a chirp (irregular period) by a curve formed on the waveguide by electron beam direct drawing or the like. Reference numeral 66 denotes a first beam splitter which is arranged between the first waveguide lens 64 and the first converging grating coupler 65 and separates the waveguide light which has been returned into the optical waveguide 62 through the first converging grating coupler 65 after it had been reflected by the optical disc 1. Reference numeral 67 denotes a first waveguide converging lens which is arranged on the optical path of the return waveguide light which has been separated by the first beam splitter 66 and converges the return light. Reference numeral 68 denotes a first photo detector which is coupled to the side surface of the optical waveguide 62 and detects the return waveguide light which has been converged by the first waveguide converging lens 67.

Similarly, reference numeral 69 denotes a second semiconductor laser coupled to the edge surface of the optical waveguide 62; 70 a second waveguide lens arranged on the optical path of the waveguide light which has been emitted from the second semiconductor laser 69 and entered the optical waveguide 61; and 71 a second converging grating coupler formed on the optical path of the parallel waveguide light. The coupler 71 emits the waveguide light to a position out of the optical waveguide 62 and converges onto the optical disc 1. Reference numeral 72 denotes a second beam splitter which is arranged between the second waveguide lens 70 and the second converging grating coupler 71 and separates the waveguide light which has been returned into the optical waveguide 62 through the second converging grating coupler 71 after it had been reflected by the optical disc 1. Reference numeral 73 denotes a second waveguide converging lens which is arranged on the optical path of the return waveguide light which has been separated by the second beam splitter 72 and converges the return waveguide light. Reference numeral 74 denotes a second photo detector which is coupled to the side surface of the optical waveguide 62 and detects the return waveguide light converged by the second waveguide converging lens 73.

A curve chirp grating of the first converging grating coupler 65 has been designed in a manner such that, for instance, NA=0.45 and the emission light can be converged until a diffraction limit and the aberration due to the disc substrate of the thickness $d_1$ can be corrected. The second converging grating coupler 71 has been designed in a manner such that, for example, NA=0.8 and the aberration due to the disc substrate of the thickness $d_2$ can be corrected.

The first and second beam splitters 66 and 72 are attached at positions which are deviated so that the reflected light of each beam splitter does not enter the other beam splitter as a stray light.

Such an optical waveguide and a waveguide type device have been described in detail in, for example, Nishihara, Haruna, and Saibara, "Optical Integrated Circuit", Ohm Co., Ltd., 1985, or the like. In the invention, both of the above well-known optical waveguide and waveguide type device can be used in the optical waveguide 62 or the like.

The operation of the optical head in the fifth embodiment with the above construction will now be described hereinbelow.

If the optical disc 1 is the first optical disc, the driving current is supplied to the first semiconductor laser 63. Then, the laser 63 emits a laser beam from one edge surface of the optical waveguide 62. The laser beam propagates as a waveguide light. The waveguide light is converted into the parallel light by the first waveguide lens 64. The parallel light transmits the first beam splitter 66 and subsequently enters the first converging grating coupler 65. The coupler 65 extracts the parallel light out of the optical waveguide 62 and converges onto the information track 200 on the first optical disc 1. The reflected light from the disc surface again enters the optical waveguide 62 through the first converging grating coupler 65 and propagates as a return waveguide light in the opposite direction. Further, the return waveguide light is reflected in the direction of the first waveguide converging lens 67 in the first beam splitter 66. The lens 67 converges the return waveguide light onto the first photo detector 68. The first photo detector 68 detects the information signal and the servo signals such as focusing error signal, tracking error signal, and the like which have been recorded on the first optical disc 1 on the basis of an intensity and an intensity distribution of the return waveguide light and generates to the outside. By modulating the driving current which is supplied to the first semiconductor laser 63, the sixth optical head 60 emits the intensity modulated laser beam, thereby recording or erasing the information signal onto/from the first optical disc 1.

On the other hand, if the optical disc 1 is the second optical disc, the operations similar to those in the case of the foregoing first optical disc are executed by the second semiconductor laser 69, second waveguide lens 70, second converging grating coupler 71, second beam splitter 72, second waveguide converging lens 73, and second photo detector 74.

The substrate 61 is supported from the head base by a focusing actuator and a tracking actuator. The position of the substrate 61 itself is controlled by the foregoing servo signals so that the laser beam is accurately irradiated onto the information track 200 on the disc.

According to the fifth embodiment as mentioned above, by providing the first converging grating coupler 65 which is formed on the optical waveguide 62 and corresponds to the thickness of the disc substrate of the first optical disc and the second converging grating coupler 71 which is formed on the optical waveguide 62 and corresponds to the thickness of the disc substrate of the second optical disc, a desired one of the couplers 65 and 71 can be independently used in accordance with the kind of disc, so that the aberration of the converged spot can be corrected in accordance with the thickness of the disc substrate and the signal can be preferably recorded, reproduced, or erased. Moreover, since the optical waveguide device having the converging grating couplers is used, the size and weight of the optical head can be reduced.

Although the thickness of the disc substrate has been set into two kinds of thicknesses in the fifth embodiment, the invention can be also applied to three or more kinds of thicknesses of disc substrates. In such a case, the number of component elements on the substrate 61 is increased in accordance with the number of thicknesses.

In the sixth optical head 60, either one of the semiconductor lasers has been allowed to emit the light. However, it is also possible to allow both of the semiconductor lasers to simultaneously emit the lights. In such a case, by designing two converging grating couplers for the optical disc having the same substrate thickness, two tracks on the optical disc 1 can be simultaneously reproduced or recorded. Thus, there is an excellent effect such that the reproducing or recording transfer speed can be doubled.

Figure 12:
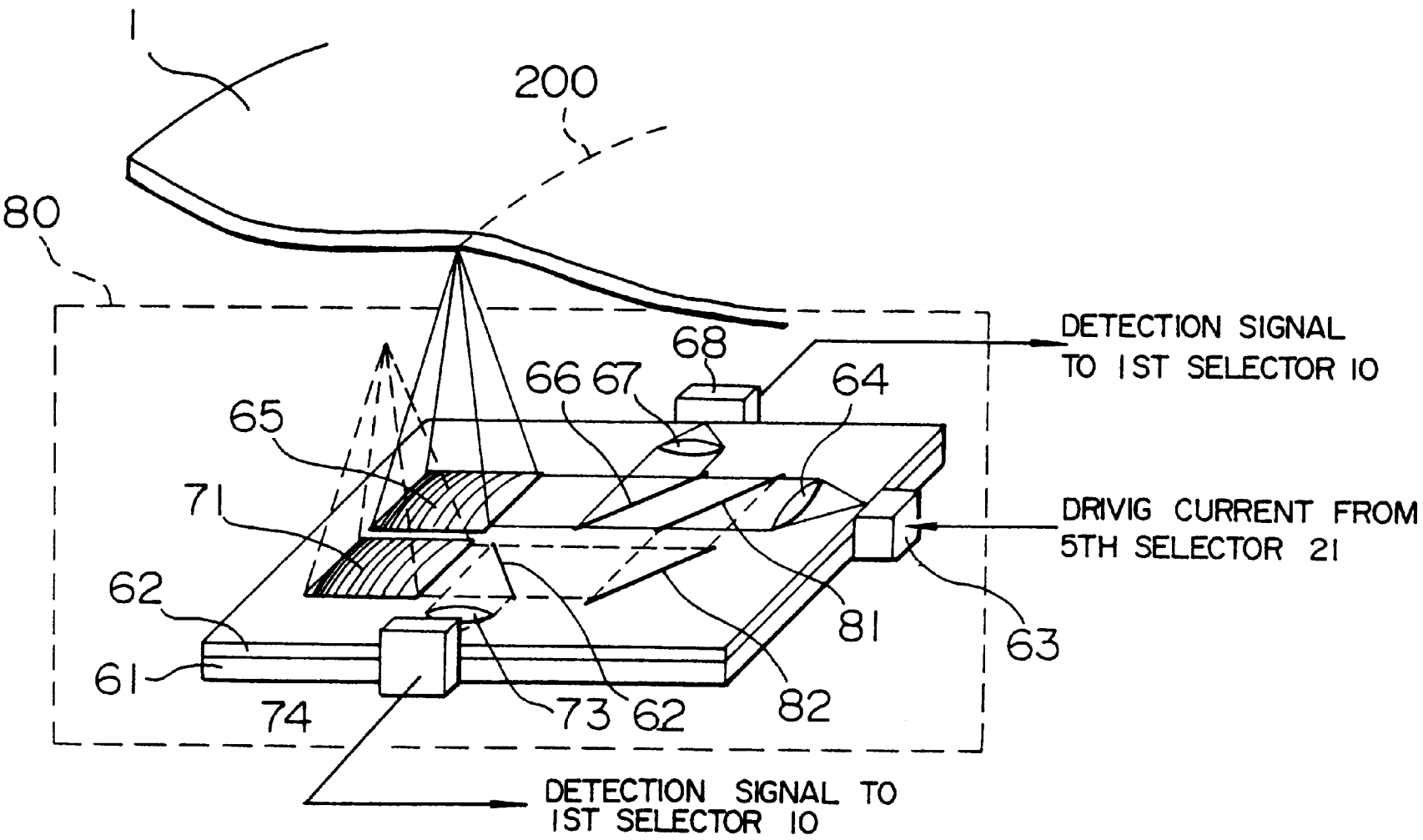
FIG. 12 is a schematic perspective view showing a construction of an optical head of an optical disc apparatus according to the sixth embodiment of the invention.

FIG. 12 is a schematic perspective view showing a construction of an optical head of an optical disc apparatus according to the sixth embodiment of the invention.

In the diagram, the sixth embodiment has substantially the same construction as that of the sixth optical head 60 shown in FIG. 11 except a third beam splitter 81 and a waveguide mirror 82 and the same parts and components as those shown in FIG. 11 are designated by the same reference numerals. That is, an optical head of the sixth embodiment, namely, a seventh optical head 80 is constructed in the following manner. In place of the second semiconductor laser 69 and the second waveguide lens 70 in the sixth optical head 60 shown in FIG. 11, the third bean splitter 81 is arranged on the optical path between the waveguide lens 64 and the beam splitter 66. In the two waveguide lights divided by the third beam splitter 81, the waveguide mirror 82 is arranged in the direction of the waveguide divided in the direction different from the direction of the first beam splitter 66 and the position of the mirror 82 is set to a position where the waveguide light reflected by the waveguide mirror 82 passes through the second beam splitter 72.

The operation of the seventh optical head 80 with the above construction will now be described hereinbelow.

The driving current is supplied to the first semiconductor laser 63. The laser 63 emits a laser beam from one edge surface of the optical waveguide 62. The laser beam propagates as a waveguide light. The waveguide light is converted into the parallel light by the first waveguide lens 64 and is divided into the transmission light and the reflected light by the third beam splitter 81. The transmission light is transferred to the first converging grating coupler 65 through the first beam splitter 66. The reflected light is reflected by the waveguide mirror 82 and enters the second converging grating coupler 71 through the second beam splitter 72. The subsequent operations are executed in a manner similar to those of the sixth optical heat 60 in the fifth embodiment of the invention.

According to the sixth embodiment as mentioned above, in addition to the effects by the foregoing fifth embodiment, by dividing the waveguide light emitted from one semiconductor laser into two lights by the third beam splitter 81 and guiding to the respective converging grating couplers, the number of semiconductor lasers which are used can be reduced.

Although the sixth embodiment has been described on the assumption that the number of thicknesses of the disc substrates is set to two kinds of thicknesses, the invention can be also applied to three or more kinds of thicknesses of the disc substrates. Now, assuming that the number of kinds of thicknesses of the disc substrates is equal to N, it is sufficient to use N converging grating couplers and (N−1) beam splitters for dividing the waveguide light emitted from the semiconductor laser. To equalize all of light quantities of the laser beans which are converged onto the discs, it is preferable to design the beam splitters so as to set division ratios of the light quantities of the beam splitters as follows.

1 : N − 1

1 : N − 2

1 : N − 3

⋮

1 : 1

Figure 13:
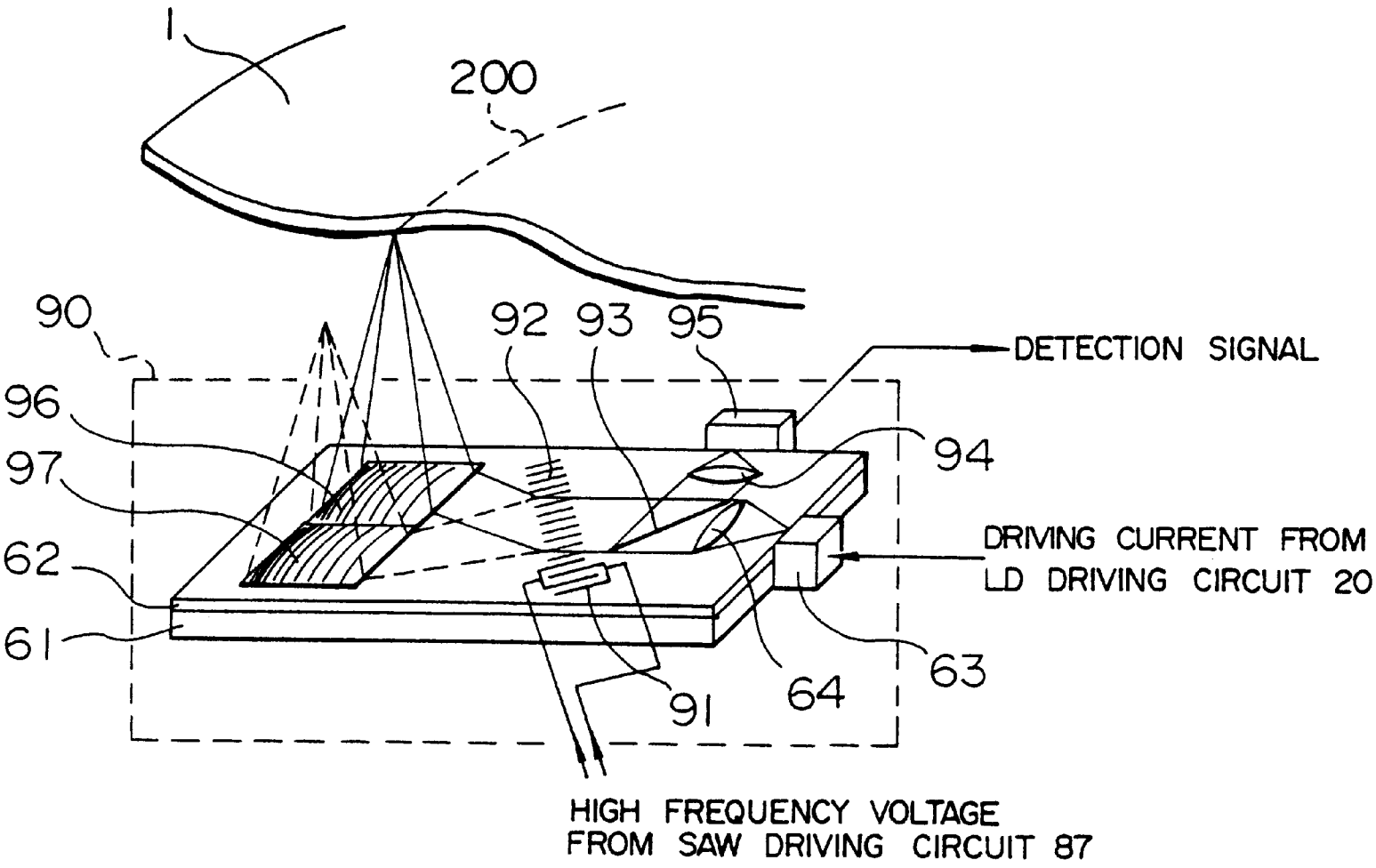
FIG. 13 is a schematic perspective view showing a construction of an optical head of an optical disc apparatus according to the seventh embodiment of the invention.
Figure 14:
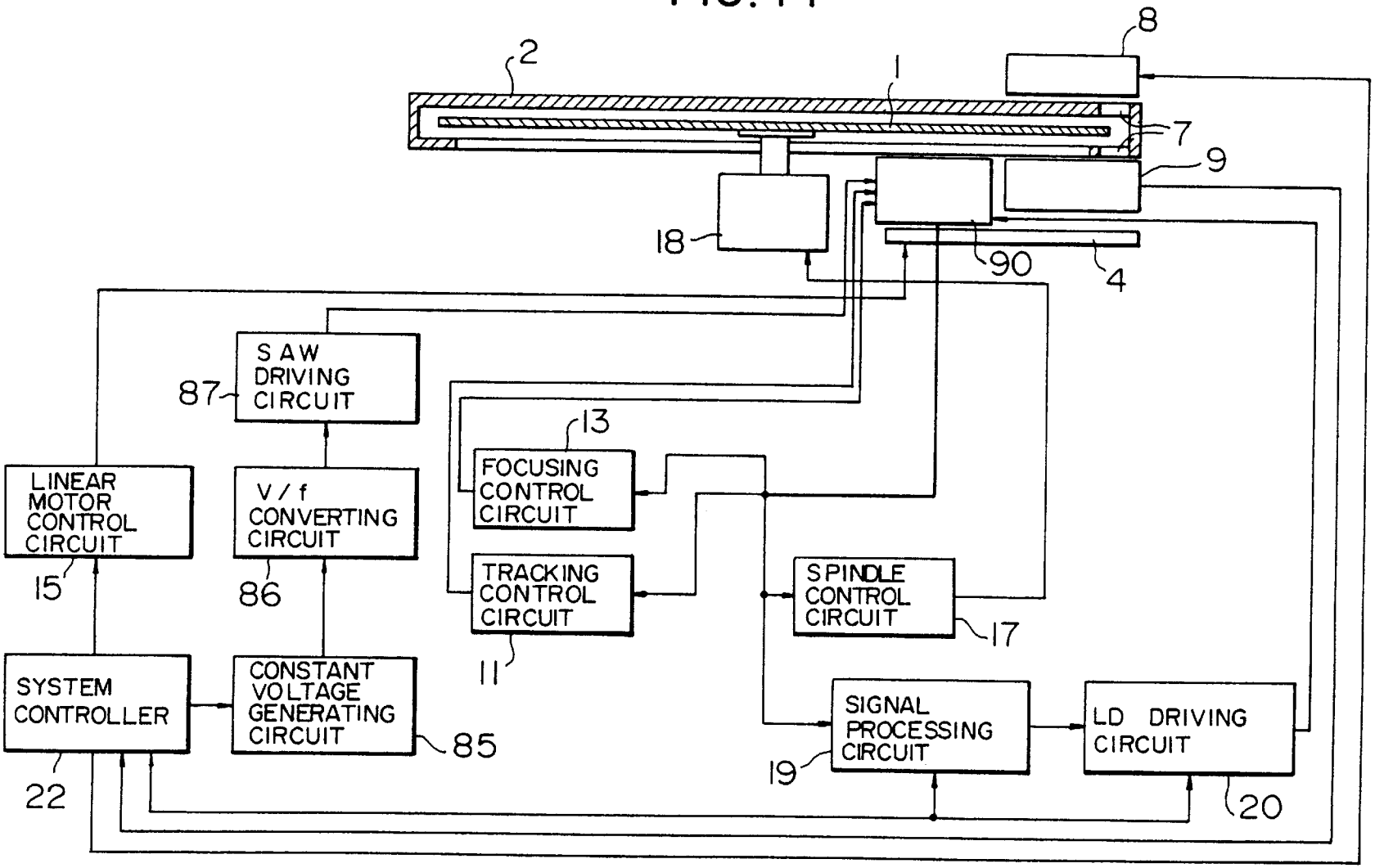
FIG. 14 is a block diagram showing a construction of the optical disc apparatus in the seventh embodiment.

FIG. 13 is a schematic perspective view showing a construction of an optical head of an optical disc apparatus according to the seventh embodiment of the invention. FIG. 14 is a block diagram showing a construction of the optical disc apparatus.

A construction of the optical head in FIG. 13 will be first described in detail.

In the diagram, since the optical disc 1, information track 200, substrate 61, optical waveguide 62, first semiconductor laser 63 and first waveguide lens 64 are fundamentally identical to the component elements in the seventh optical head 80 shown in FIG. 12, their detailed descriptions are omitted here. Reference numeral 91 denotes an SAW (surface acoustic wave) transducer arranged on the optical waveguide 62 so that a surface acoustic wave generated by the SAW transducer crosses the optical path of the waveguide light emitted from the first waveguide lens 64. The SAW transducer 91 is constructed by a cross finger electrode comprising a piezoelectric transducer of ZnO or the like. Reference numeral 92 indicates a surface acoustic wave generated by the SAW transducer 91; 96 a third converging grating coupler formed on the optical path of the waveguide light which has been diffracted by such a surface acoustic wave 92 and propagates in the first direction; and 97 a fourth converging grating coupler which is likewise formed on the optical path of the waveguide light propagating in the second direction. Each of the couplers 96 and 97 emits the waveguide light to a region out of the optical waveguide 62 and converges onto the optical disc 1. Reference numeral 93 denotes a fourth beam splitter which is arranged between the first waveguide lens 64 and the progressing path of the surface acoustic wave 92 and reflects the waveguide light returned into the optical waveguide 62 through the third or fourth converging grating couplers 96 and 97 after it had been reflected by the optical disc 1. Reference numeral 94 denotes a third waveguide converging lens which is arranged on the optical path of the return light reflected by the fourth beam splitter 93 and converges the return light and 95 indicates a third photo detector which is coupled to the side surface of the optical waveguide 62 and detects the return light converged by the third waveguide converging lens 94.

The above SAW transducer has also been described in detail in the foregoing "Optical Integrated Circuit" or the like and both of the well-known optical waveguide and waveguide type device described in the above literature can be also obviously used.

The operation of the optical head in the seventh embodiment with the above construction will now be described hereinbelow.

The first semiconductor laser 63 emits a laser beam from one edge surface of the optical waveguide 62. The laser beam propagates as a waveguide light. The waveguide light is converted into the parallel light by the first waveguide lens 64 and transmits through the fourth beam splitter 93. After that, the light transverses the surface acoustic wave 92 generated from the SAW transducer 91. At this time, the propagating direction of the parallel waveguide light is changed by an acoustic optical interaction with the surface acoustic wave 92. Since a deflection angle at this time changes in accordance with a frequency of the surface acoustic wave 92, the waveguide light can be propagated in any one of the directions of the third and fourth converging grating couplers 96 and 97 in accordance with frequencies of high-frequency voltages which are applied to the SAW transducer 91 from the outside (it is now assumed that the frequencies of the high-frequency voltages are set to $f_1$ and $f_2$, respectively). In the case of the first optical disc, therefore, the high-frequency voltage of the frequency $f_1$ is applied to the SAW transducer 91 from the outside, thereby allowing the parallel waveguide light to enter the third converging grating coupler 96. The third converging grating coupler 96 extracts the parallel waveguide light to a region out of the optical waveguide 62 and converges onto the information track 200 on the first optical disc 1. The reflected light from the disc surface again enters the optical waveguide 62 through the third grating coupler 96 and propagates as a return waveguide light in the opposite direction. The progressing direction of the waveguide light is changed by the surface acoustic wave 92 and, after that, the waveguide light is reflected in the direction of the third waveguide converging lens 94 by the fourth beam splitter 93. The third waveguide converging lens 94 converges the return light to the third photo detector 95. The third photo detector 95 detects the information signal and the servo signals such as focusing error signal, tracking error signal, and the like which have been recorded on the first optical disc 1 on the basis of an intensity and an intensity distribution of the return light and generates to the outside. By modulating the driving current which is supplied to the first semiconductor laser 63, an eighth optical head 90 emits the intensity modulated laser beam, thereby recording or erasing the information signal onto/from the first optical disc 1.

On the other hand, in the case of the second optical disc, the high-frequency voltage of the frequency $f_2$ is applied to the SAW transducer 91 from the outside, thereby allowing the parallel waveguide light to enter the fourth converging grating coupler 97. The subsequent operations are executed in a manner similar to those in the case of the first optical disc.

The substrate 61 is supported from the head base by a focusing actuator and a tracking actuator (not shown). The position of the substrate 61 itself is controlled by the servo signals so that the laser beam is accurately irradiated onto the information track 200 on the disc.

An optical disc apparatus having the eighth optical head 90 mentioned above will now be described with reference to FIG. 14.

In the diagram, the optical disc 1, cartridge 2, first linear motor 4, discrimination hole 7, LED 8, photo diode 9, tracking control circuit 11, focusing control circuit 13, linear motor control circuit 15, spindle control circuit 17, spindle motor 18, signal processing circuit 19, LD driving circuit 20 and system controller 22 are the same as those in the optical disc apparatus in the third embodiment according to the invention. Reference numeral 90 denotes the eighth optical head which is constructed by the waveguide substrate, focusing actuator, tracking actuator, head base and the like. Reference numeral 85 denotes a constant voltage generating circuit which receives a control signal from the system controller 22 and generates a predetermined voltage $V_i$. Reference numeral 86 denotes a V/f converting circuit which receives the voltage $V_i$ from the constant voltage generating circuit 85 and generates a high-frequency signal of a frequency f which is proportional to $V_i$. The V/f converting circuit 86 generates a high-frequency signal of the frequency $f_i$ when the input voltage $V_i=V_1$ and generates a high frequency signal of the frequency $f_2$ when $V_i=V_2$. Reference numeral 87 denotes an SAW driving circuit to apply a high-frequency voltage of the same frequency as the frequency f of the high-frequency signal supplied from the V/f converting circuit 86 to the SAW transducer 91 of the eighth optical head 90.

The operation of the optical disc apparatus in the seventh embodiment with the above construction will now be described hereinbelow.

First, if the cartridge 2 enclosing the second optical disc has been loaded into the optical disc apparatus of the seventh embodiment, the system controller 22 determines that the disc in the loaded cartridge 2 is the second optical disc by the detection signal of the photo diode 9, so that the controller 22 generates a control signal to the constant voltage generating circuit 85 so as to generate the voltage $V_2$. The V/f converting circuit 86 converts the input voltage $V_2$ into the frequency $f_2$, so that the SAW driving circuit 87 applies the high-frequency voltage of the frequency $f_2$ to the SAW transducer 91 of the eighth optical head 90. Therefore, in the eighth optical head 90, the laser beam is irradiated from the second converging grating coupler 97 and is converged without an aberration onto the information track 200 on the second optical disc having the disc substrate of the thickness $d_2$. At the same time, the third photo detector 95 of the eighth optical head 90 detects a focusing error signal and a tracking error signal from the reflected light from the optical disc and supplies to the tracking control circuit 11 and the focusing control circuit 13. Further, the information signal on the disc is supplied to the signal processing circuit 19 and the spindle control circuit 17.

On the other hand, in the case of the first optical disc, the system controller 22 generates a control signal to the constant voltage generating circuit 85 so as to generate the voltage $V_1$. The V/f converting circuit 86 converts the input voltage $V_1$ into the frequency $f_1$, so that the SAW driving circuit 87 applies the high-frequency voltage of the frequency $f_1$ to the SAW transducer 91 of the eighth optical head 90. Therefore, in the eighth optical head 90, a laser beam is emitted from the first converging grating coupler 96 and is converged without an aberration onto the information track 200 on the first optical disc having the disc substrate of the thickness $d_1$. The other operations are executed in a manner similar to those in the case of the foregoing second optical disc According to the embodiment as mentioned above, in addition to the effects of the above sixth embodiment, the number of semiconductor lasers which are necessary in the eighth optical head 90 is only one and each of the converging grating couplers does not simultaneously emit the laser beam, so that an emission power of the semiconductor laser can be efficiently taken out of the converging grating coupler. That is, the optical head having a transfer efficiency better than that of the seventh optical head 80 in the foregoing sixth embodiment can be provided.

Further, by arranging the fourth beam splitter 93 between the waveguide lens 64 and the SAW transducer 91, the return lights from the two converging grating couplers can be detected by one photo detector.

Although the number of thicknesses of the disc substrates has been set to two kinds of thicknesses in the embodiment, the invention can be also obviously applied to three or more kinds of thicknesses of the disc substrates. In such a case, the number of converging grating couplers is increased in accordance with the number of kinds of thicknesses and the optical paths are switched by the SAW transducer 91 in accordance with the increased number of such couplers.

An optical disc apparatus in the eighth embodiment of the invention will now be described.

Figure 15:
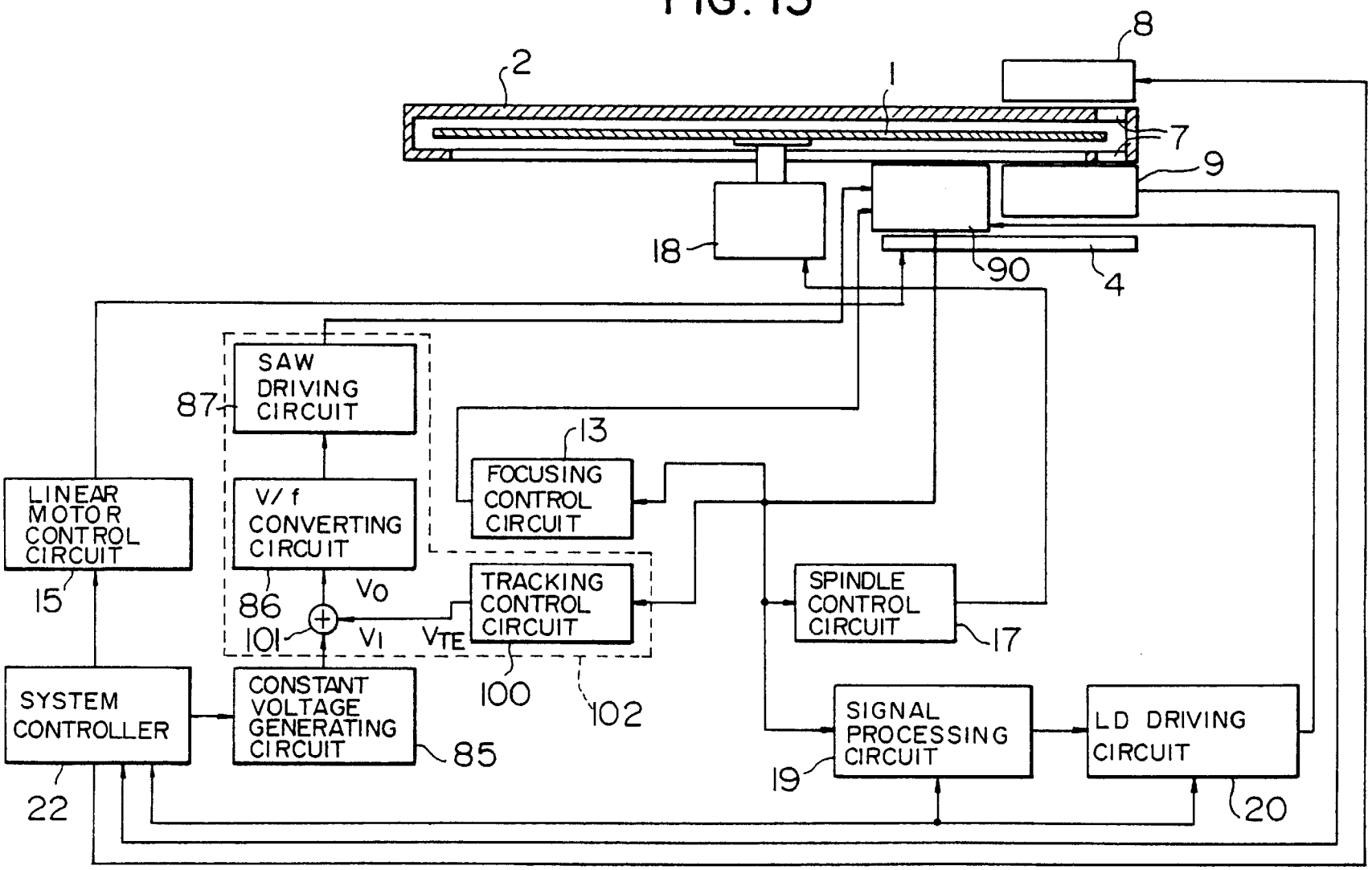
FIG. 15 is a block diagram showing a construction of an optical disc apparatus according to the eighth embodiment of the invention.

FIG. 15 is a block diagram showing a construction of the optical disc apparatus in the eighth embodiment. In the diagram, reference numeral 1 denotes the first or second optical disc; 2 the cartridge; 4 the linear motor; 7 the discrimination hole; 8 the LED; 9 the photo diode; 13 the focusing control circuit; 15 the linear motor control circuit; 17 the spindle control circuit; 18 the spindle motor; 19 the signal processing circuit; 20 the LD driving circuit; 22 the system controller, 85 the constant voltage generating circuit; 86 the V/f converting circuit; and 87 the SAW driving circuit. The above component elements are the same as those in the optical disc apparatus in the seventh embodiment of FIG. 14 and their detailed descriptions are omitted here. Reference numeral 90 denotes an optical head which is substantially the same as the eighth optical head 90 mentioned above except that the optical head in the eighth embodiment does not have a tracking actuator. Therefore, the optical head in FIG. 15 is also referred to as an eighth optical head 90 hereinafter for convenience of explanation. Reference numeral 100 denotes a tracking error detecting circuit which receives a tracking error signal from the third photo detector 95 of the eighth optical head 90 and generates a tracking error voltage $V_{TE}$ to in adder 101, which will be explained hereinafter. Reference numeral 101 denotes the adder. The voltage $V_{TE}$ which is generated from the tracking error detecting circuit 100 and the voltage $V_i$ which is generated from the constant voltage generating circuit 85 are supplied to the adder 101, so that the adder generates a voltage $V_0$ ($V_0=V_{TE}+V_i$) to the V/f converting circuit 86. The V/f converting circuit 86, SAW driving circuit 87, tracking error detecting circuit 100, and adder 101 construct a tracking control circuit 102. That is, it is the inventive point of the eighth embodiment that the tracking control is executed by using the SAW transducer 91 of the eighth optical head 90.

Figure 16:
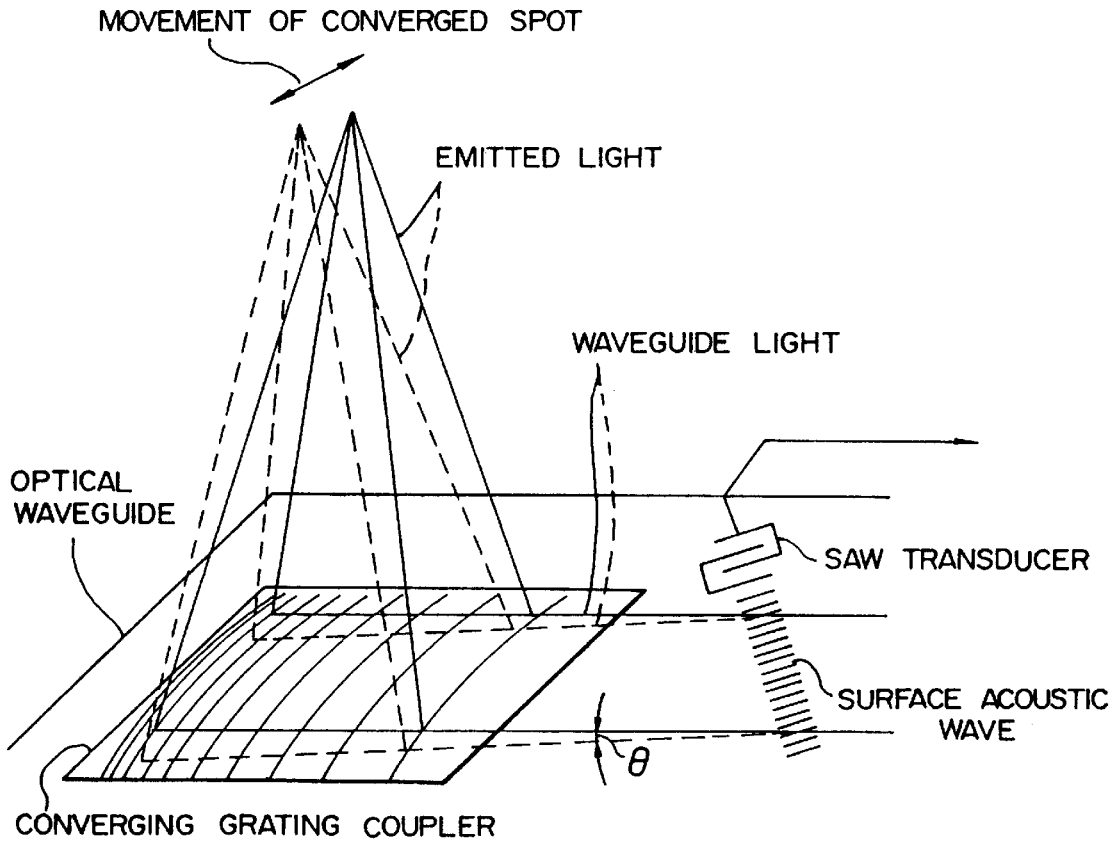
FIG. 16 is a schematic enlarged perspective view showing a convergence grating coupler of an optical bead, an SAW transducer, and a portion in which surface acoustic waves have been formed in the eighth embodiment.

The principle of the tracking control of the eighth embodiment will now be described hereinbelow with reference to the drawings. FIG. 16 is an enlarged schematic perspective view of the converging grating coupler, SAW transducer, and portion where a surface acoustic wave has been formed. The waveguide light which enters the converging grating coupler is oscillated between solid lines and broken lines in accordance with a microchange of the frequency of the surface acoustic wave. Such an oscillation angle is called a deflection angle (shown by θ). Therefore, the emission light from the converging grating coupler is also oscillated and the converged spot moves. Since the deflecting angle θ changes in almost proportional to the frequency of the surface acoustic wave, by changing the frequency in accordance with the tracking error amount, the converged spot can be accurately positioned onto the information track.

The operation of the optical disc apparatus of the embodiment constructed as shown in FIG. 15 will now be described hereinbelow. First, if the disc in the loaded cartridge 2 is the second optical disc, the system controller 22 controls the constant voltage generating circuit 85 so as to set the output voltage $V_i$ into $V_2$. The output voltage $V_{TE}$ of the tracking error detecting circuit 100 has been initialized to "0". The adder 101 adds the voltages $V_i$ and $V_{TE}$ and generates the voltage $V_0$ (=$V_2$) to the V/f converting circuit 86. The V/f converting circuit 86 changes a frequency $f_s$ of an output signal in accordance with the input voltage $V_0$. The optical disc apparatus has been designed in a manner such that the signal of a frequency $f_s$(=$f_1$) is generated when $V_0$=$V_1$ and the signal of a frequency $f_s$ (=$f_2$) is generated when $V_0$=$V_2$ and the frequency $f_s$ changes in proportion to the input voltage $V_0$. Therefore, the V/f converting circuit 86 supplies a high-frequency signal of the frequency $f_2$ to the SAW driving circuit 87. The SAW driving circuit 87 applies a high-frequency voltage of the frequency $f_2$ to the SAW transducer 91 of the eighth optical head 90. In the eighth optical head 90, consequently, the laser beam is emitted from the fourth converging grating coupler 97 and is converged without an aberration onto the information track on the second optical disc. At the same time, in the eighth optical head 90, the reflected light from the disc is detected by the third photo detector 95. A tracking error signal is supplied to the tracking error detecting circuit 100. A focusing error signal is supplied to the focusing control circuit 13. The information signal is supplied to the spindle control circuit 17 and the signal processing circuit 19. The tracking error detecting circuit 100 produces the tracking error voltage $V_{TE}$ in accordance with a track deviation amount of the converged spot on the information track 200 and supplies to the adder 101. The adder 101 sends the output voltage $V_0$=$V_2$+$V_{TE}$ to the V/f converting circuit 86 as mentioned above. In accordance with the output voltage $V_0$, the output signal frequency $f_s$ of the V/f converting circuit 86 is deviated from the frequency $f_2$ by a value corresponding to the tracking error (assumes $d_f$). As mentioned above, when the frequency of the driving voltage to the SAW transducer 91 changes, the emitting position of the light from the fourth converging grating coupler 97 changes and the position of the converged spot on the optical disc 1 changes for the track. Therefore, by setting a converting equation between $V_0$ and $f_s$ of the V/f converting circuit 86 so as to allow the converged spot on the optical disc 1 to approach the track, the tracking error is eliminated. The other operations are executed in a manner similar to those of the optical disc apparatus in the seventh embodiment.

On the other hand, in the case of the first optical disc, the system controller 22 controls the constant voltage generating circuit 85, thereby setting the output voltage $V_i$ into $V_1$. Thus, the V/f converting circuit 86 generates a high-frequency signal of the frequency $f_1$ to the SAW driving circuit 87 and the SAW driving circuit 87 applies a high-frequency voltage of the frequency $f_1$ to the SAW transducer 91 of the eighth optical head 90. Consequently, in the eighth optical head 90, the laser beam is emitted from the third converging grating coupler 96 and is converged without an aberration onto the information track 200 on the first optical disc. At the same time, the tracking error detecting circuit 100 supplies the tracking error voltage $V_{TE}$ to the adder 101 from the input signal $T_1$. The input voltage of the V/f converting circuit 86 is set to $V_0$=$V_1$+$V_{TE}$ and the tracking error can be eliminated in a manner similar to the case of the second optical disc.

Figure 17:
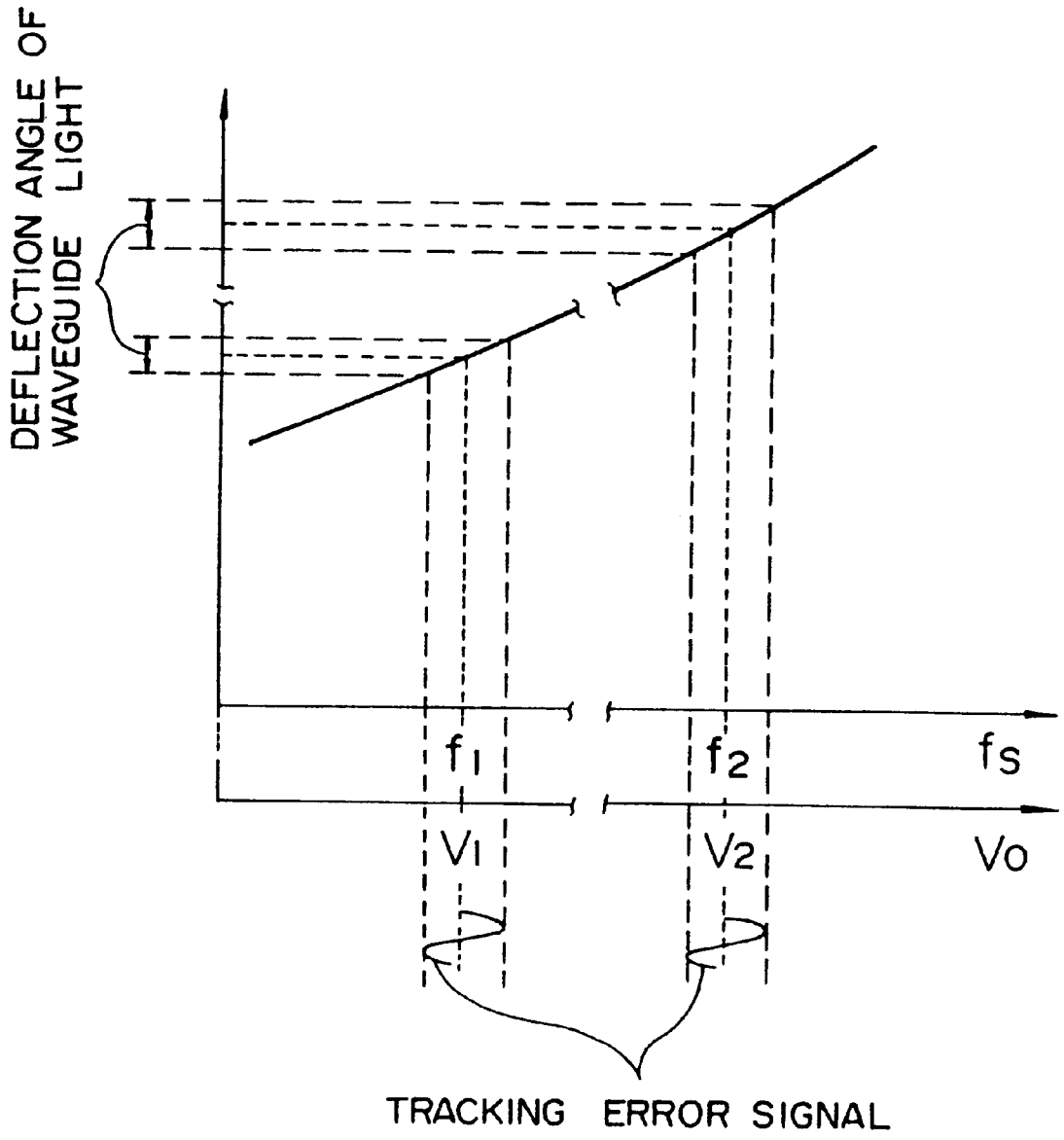
FIG. 17 is a characteristic diagram for explaining the principle of the tracking control in the eighth embodiment.
Figure 18A:
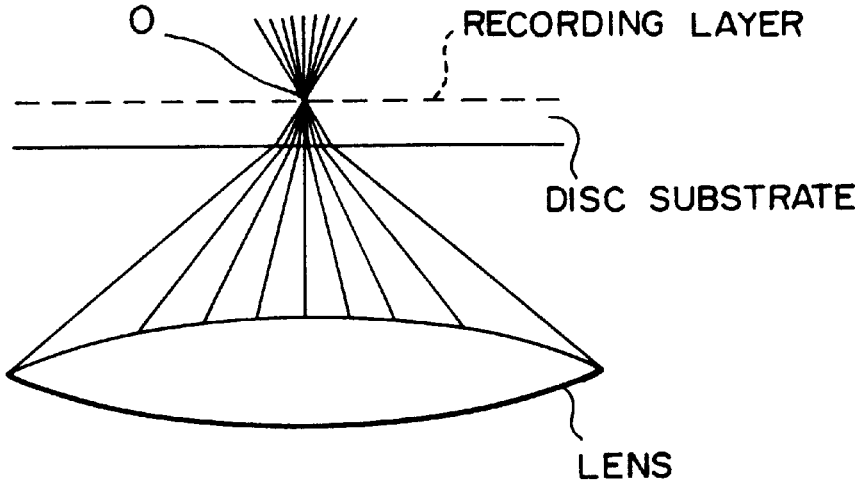
FIG. 18A PRIOR ART
FIGS. 18A and 18B are schematic side elevational views showing occurring situations of aberrations due to disc substrates having different thicknesses.
Figure 18B:
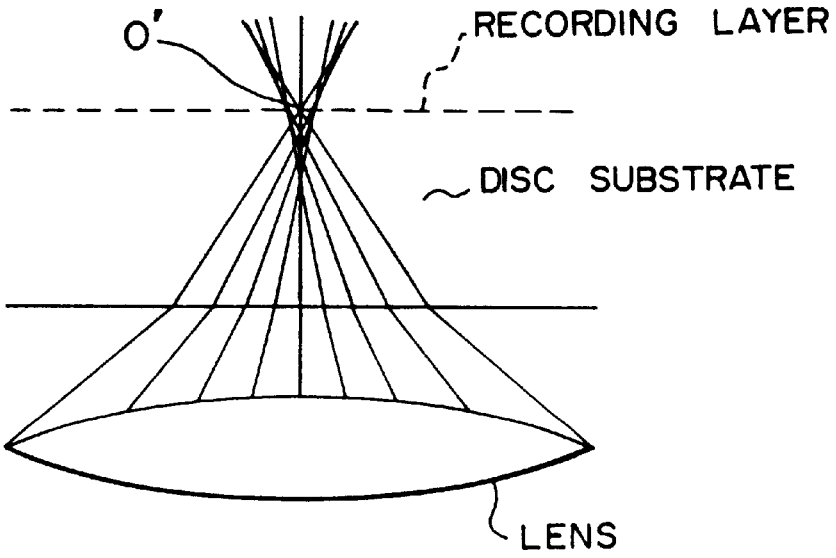
FIG. 18B PRIOR ART

FIG. 17 is a graph showing the principle of the tracking control of the embodiment and shows the relations among the $V_0$ and $f_s$ and the deflection angle of the waveguide light in the eighth optical head 90. As shown in the graph, by varying the $V_0$ and $f_s$ by only an amount which is proportional to the tracking error signal from $V_1$, accordingly, $f_1$ as a center in the case of the first optical disc or by only an amount which is proportional to the tracking error signal from $V_2$, accordingly, $f_2$ as a center in the case of the second optical disc, the oscillation angle of the waveguide light can be finely varied. Therefore, by varying the emitting positions of the light beams from the two converging grating couplers, the converged spot can be allowed to trace on the track.

According to the eight embodiment as mentioned above, in addition to the effects of the foregoing seventh embodiment, the change-over of the waveguide lights which enter the converging grating couplers and the tracking control can be executed by the SAW transducer 91. Thus, the optical head can be simplified and the number of manufacturing steps can be reduced.

Since the surface acoustic wave 92 is located between the fourth beam splitter 93 and the two converging grating couplers, the return waveguide light from the optical disc 1 is not influenced by the tracking control on the optical path after the surface acoustic wave 92. Therefore, the converging position on the third photo detector is not moved by the tracking control, so that a deterioration in photo detection signal can be prevented.

In the embodiment, although the SAW transducer has been used as both of the optical path switching means and the optical path deflecting means for tracking control, the SAW transducer can be also provided for the optical head only for the tracking control. For instance, it is also possible to form the SAW transducer for the sixth optical head 60 in the fifth embodiment or the seventh optical head 80 in the sixth embodiment and to execute the tracking control.

We claim:

1. An optical recording/reproducing apparatus for recording, reproducing or erasing an information signal by converging a light flux onto/from a recording layer through a transparent disc substrate, comprising:

(a) N optical heads, N being greater than or equal to 2, each comprising:

light emitting means, objective lenses, whose aberrations have respectively been corrected for said N disc substrates having different thicknesses, each for converging the light flux which is emitted from the light emitting means onto the optical disc, and a plurality of photo detecting means each for detecting the reflected light from the optical disc;

(b) N optical head moving means which are arranged below the optical disc and move the N optical heads in the radial direction of the optical disc;

(c) disc discriminating means for discriminating the thickness of the disc substrate of the loaded optical disc and for generating a discrimination signal in accordance with the result of the discrimination; and (d) control means for selecting the optical head having the objective lens in which the occurrence of the aberration due to the disc substrate is smallest in accordance with the discrimination signal, wherein the selected optical head records, reproduces or erases the information signal onto/from the optical disc.

2. An apparatus according to claim 1, further comprising backward moving means for moving the non-selected optical heads to the outside of the optical disc for a period of time when the optical head which has been selected by the control means is recording, reproducing, or erasing the information signal.

3. An apparatus according to claim 1, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

4. An apparatus according to claim 2, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discretion signal.

5. An apparatus according to claim 1, wherein numerical apertures of at least two or more of said N objective lenses differ.

6. An apparatus according to claim 2, wherein numerical apertures of at least two or more of said N objective lenses differ.

7. An optical recording/reproducing apparatus for recording, reproducing or erasing an information signal by converging a light flux onto/from a recording layer through a transparent disc substrate, comprising:

(a) an optical head having N, N being greater than or equal to 2, converging optical systems each comprising:

light emitting means, objective lenses, whose aberrations have respectively been corrected for said N disc substrates having different thicknesses, each for converging the light flux which is emitted from the light emitting means onto the optical disc, and a plurality of photo detecting means each for detecting the reflected light from the optical disc;

(b) optical head moving means which is arranged below the optical disc and moves the optical head in the radial direction of the optical disc;

(c) disc discriminating means for discriminating the thickness of the disc substrate of the loaded optical disc and for generating a discrimination signal in accordance with the result of the discrimination; and (d) control means for allowing the light emitting means, which belongs to the converging optical system in which the occurrence of the aberration due to the disc substrate is smallest in accordance with the discrimination signal, to emit light, wherein the selected converging optical system records, reproduces or erases the information signal onto/from the optical disc.

8. An apparatus according to claim 7, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

9. An apparatus according to claim 7, wherein numerical apertures of at least two or more of said N objective lenses differ.

10. An optical recording/reproducing apparatus for recording, reproducing or erasing an information signal by converging a light flux onto/from a recording layer through a transparent disc substrate, comprising:

(a) an optical head including:

light emitting means, light flux dividing means which are arranged in the light flux from the emitting means and divide the emitted light flux into N, N being greater than or equal to 2, light fluxes and deflect in different directions, N objective lenses, whose aberrations have respectively been corrected for said N disc substrates having different thicknesses, for respectively converging said N light fluxes onto the optical disc, light flux selecting means for selecting one of the N light fluxes divided by the light flux dividing means and for allowing said light flux to pass, and photo detecting means for detecting the light fluxes reflected by the optical disc;

(b) optical head moving means which is arranged below the optical disc and moves the optical head in the radial direction of the optical disc;

(c) disc discriminating means for discriminating the thickness of the disc substrate of the loaded optical disc and for generating a discrimination signal in accordance with the result of the discrimination; and (d) control means for generating a control signal to the light flux selecting means in accordance with the discrimination signal and for selecting the light flux which passes through the objective lens in which the occurrence of the aberration due to the disc substrate is smallest, wherein the optical head records, reproduces or erases the information signal onto/from the optical disc by the selected light flux.

11. An apparatus according to claim 10, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

12. An apparatus according to claim 10, wherein numerical apertures of at least two or more of said N objective lenses differ.

13. An optical recording/reproducing apparatus for recording, reproducing or erasing an information signal by converging a light flux onto/from a recording layer through a transparent disc substrate, comprising:

(a) an optical head including:

an optical waveguide formed on a substrate,

N light emitting means each for emitting a waveguide light into said optical, waveguide, N being greater than or equal to 2, N converging grating couplers, whose aberrations have respectively been corrected for said N disc substrates having different thicknesses, each for emitting the waveguide light supplied from said N light emitting means to the outside of the optical waveguide and for allowing the reflected light from the optical disc to enter, and N photo detecting means each for detecting reflected light and for generating an information signal;

(b) optical head moving means which is arranged below the optical disc and moves the optical head in the radial direction of the optical disc;

(c) selecting means for selecting the light emitting means to be allowed to emit the light from among the N emitting means;

(d) disc discriminating means for discriminating the thickness of the disc substrate of the loaded optical disc and for generating a discrimination signal according to the result of the discrimination; and (e) control means for generating a control signal in accordance with the discrimination signal, for providing said control signal to said selecting means and for allowing the light emitting means for emitting the waveguide light into the converging grating coupler in which the occurrence of the aberration due to the disc substrate is smallest, wherein the optical head records, reproduces or erases the information signal onto/from the optical disc by the light flux from the selected light emitting means.

14. An apparatus according to claim 13, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

15. An apparatus according to claim 13, wherein numerical apertures of at least two or more of the N converging grating couplers differ.

16. An optical recording/reproducing apparatus for recording, reproducing or erasing an information signal by converging a light flux onto/from a recording layer through a transparent disc substrate, comprising:

(a) an optical head including:

an optical waveguide formed on a substrate, light emitting means for emitting a waveguide light into said optical waveguide, light flux dividing means for dividing the waveguide light emitted from the light emitting means into N divided waveguide lights, N being greater than or equal to 2, said N converging grating couplers, whose aberrations have respectively been corrected for said N disc substrates having different thicknesses, each for emitting each of said N divided waveguide lights to the outside of the optical waveguide and for allowing the reflected light from the optical disc to enter, and N photo detecting means for respectively detecting said reflected lights from the N converging grating couplers and for generating information signals;

(b) optical bead moving means which is arranged below the optical disc and moves the optical head in the radial direction of the optical disc;

(c) output switching means for selecting and outputting one of the output signals of said N photo detecting means;

(d) disc discriminating means for discriminating the thickness of the disc substrate of the loaded optical disc and for generating a discrimination signal in accordance with the result of the discrimination; and (e) control means for generating a control signal to the output switching means in accordance with the discrimination signal and for selecting the photo detecting means into which the waveguide light enters from the converging grating coupler in which the occurrence of the aberration due to the disc substrate is smallest.

17. An apparatus according to claim 16, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

18. An apparatus according to claim 16, wherein numerical apertures of at least two or more of the N converging grating couplers differ.

19. An optical recording/reproducing apparatus for recording, reproducing or erasing an information signal by converging a light flux onto/from a recording layer through a transparent disc substrate, comprising:

(a) an optical head including:

an optical waveguide formed on a substrate, light emitting means for emitting a waveguide light into said optical waveguide, optical path switching means which is arranged on an optical path of said waveguide light and switches the propagating direction of the waveguide light in N directions in accordance with a control signal, N being greater than or equal to 2, N converging grating couplers, whose aberrations have respectively been corrected for said N disc substrates having different thicknesses and which are respectively arranged in said N propagating directions which are switched by said optical path switching means and emit the waveguide light to the outside of the optical waveguide and allow the reflected light from the optical disc to enter, and photo detecting means for detecting the reflected light and generating an information signal;

(b) optical head moving means which is arranged below the optical disc and moves the optical head in the radial direction of the optical disc;

(c) disc discriminating means for discriminating the thickness of the disc substrate of the loaded optical disc and for generating the discrimination signal in accordance with the result of the discrimination; and (d) control means for generating a control signal to the optical path switching means in accordance with the discrimination signal and for switching the propagating direction of the waveguide light from the light emitting means to the direction of the converging grating coupler in which the occurrence of the aberration due to the disc substrate is smallest, wherein the optical head records, reproduces or erases the information signal onto/from the optical disc by the light flux emitted from the selected converging grating coupler.

20. An apparatus according to claim 19, wherein said optical path switching means combines deflecting means for changing the propagating direction of the waveguide light by a deflection angle according to a input signal, and wherein said apparatus comprises:

tracking error detecting means for detecting a tracking error amount of a converged spot which has been converged onto the optical disc and for generating a tracking error signal; and tracking control means for changing the input signal to the deflecting means in accordance with said tracking error signal and for eliminating the tracking error of the converged spot.

21. An apparatus according to claim 19, wherein said disc discriminating means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

22. An apparatus according to claim 20, wherein said disc discrimination means comprises:

a cartridge for enclosing the optical disc;

a discrimination hole which is formed on the cartridge and whose opening/closing state differs in correspondence to the thickness of the disc substrate of the optical disc; and detecting means for detecting the opening/closing state of the discrimination hole and for generating a discrimination signal.

23. An apparatus according to claim 19, wherein numerical apertures of at least two or more of the N converging grating couplers differ.

24. An apparatus according to claim 20, wherein numerical apertures of at least two or more of the N converging grating couplers differ.

*25. An optical recording/reproducing apparatus for recording, reproducing or erasing an information signal onto/from an optical disc having at least a transparent substrate and an information layer by converging a light flux onto said information layer through said transparent substrate, comprising an optical means having one of (a) N (where N≧2) different numerical apertures, (b) N different focal distances and (c) N different working distances, for converging the light flux on said information layer, wherein said optical disc corresponds to one of N types of optical discs provided with transparent substrates having different thicknesses and said optical converging means converges said light flux by employing one of (a) a larger one of said N numerical apertures, (b) a shorter one of said focal distances and (c) a shorter one of said working distances, with respect to one of said optical discs having a thinner one of said substrates.*

*26. An optical recording/reproducing apparatus for recording, reproducing or erasing an information signal onto/from any selected one of N types (where N≧2) of optical discs having transparent substrates of different thicknesses, each of said N optical discs having at least a transparent substrate and an information layer, by converging a light flux on said information layer through said transparent substrate, said apparatus comprising:*

*at least one light emitting means for emitting said light flux;*

*N converging means having one of (a) different numerical apertures, (b) different focal distances and (c) different working distances and performing aberration correction over a transparent substrate of a respective one of said N optical discs, each of said N converging means operating to converge said light flux on the information layer of one of the N optical discs; and*

*at least one photo detecting means for detecting reflected light from said optical discs,*

*wherein one of said converging means having (a) a larger one of said numerical apertures, (b) a shorter one of said focal distances and (c) a shorter one of said working distances, is selected for use with one of said N optical discs having a thinner one of said transparent substrates.*

*27. An optical recording/reproducing apparatus according to claim 26, wherein each of said N converging means is an objective lens.*

*28. An optical recording/reproducing apparatus according to claim 26, wherein each of said N converging means is a grating lens.*

*29. An optical recording/reproducing system for recording, reproducing or erasing an information signal onto/from any selected one of N types (where N≧2) of optical discs having transparent substrates of different thicknesses, each of said N optical discs having at least a transparent substrate and an information layer, by converging a light flux on said information layer through said transparent substrate, said apparatus comprising:*

*at least one light emitting means for emitting said light flux;*

*a single converging means for converging said light flux on said information layer;*

*at least one optical wave front transforming means, at least one of said at least one optical wave front transforming means being disposed in an optical path connecting a light source, said converging means and one of said N optical discs; and*

*at least one photo detecting means for detecting reflected light from said one of said N optical discs,*

*wherein N composite converging, optical systems having one of (a) different numerical apertures, (b) different focal distances and (c) different working distances and each including said converging means and one of said N optical wave front transforming means respectively perform aberration correction over a transparent substrate of a respective one of said N optical discs, and one of said composite converging optical systems having one of (a) a larger one of said numerical apertures, (b) a shorter one of said focal distances and (c) a shorter one of said working distances, is selected for use with one of said N optical discs having a thinner one of said transparent substrates.*

*30. An optical recording/reproducing apparatus according to claim 29, wherein said converging means is an objective lens.*

*31. An optical recording/reproducing apparatus as in claim 29, wherein said converging means is a grating lens.*

*32. An optical recording/reproducing apparatus for recording, reproducing or erasing an information signal onto/from any selected one of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) N (where N≧2) optical heads each including: (i) a light emitting means for emitting a light flux, (ii) a converging means for converging the light flux emitted from said light emitting means onto an information layer of one of said N optical discs loaded in said*

*apparatus and (iii) at least one photo detecting means for detecting reflected light from said one of said N optical discs;*

*(b) optical head moving means, adapted to be arranged on one side of an optical disc loaded in said apparatus, for moving said N optical heads in a radial direction of said optical disc loaded in said apparatus; and*

*(c) control means for selecting, one of said N optical heads,*

*wherein said converging means of each of said N optical heads have one of (a) respective numerical apertures, (b) respective focal distances and (c) respective working distances and perform aberration correction over transparent substrates of respective ones of said N optical discs, one of said N optical heads provided with one of said converging means having one of (a) a larger one of said numerical apertures, (b) a shorter one of said focal distances and (c) a shorter one of said working distances, is selected for use with one of said N optical discs having a thinner one of said transparent substrates, and said one of said N optical heads selected by said control means performs a recording, reproducing or erasing operation of said information signal on an optical disc loaded in said apparatus.*

*33. An apparatus according to claim 32, further comprising disc discriminating means for discriminating a type of said optical disc loaded in said apparatus and for outputting a discrimination signal according to a discrimination result, and wherein said control means selects one of said N optical heads provided with one of said converging means that generates a least aberration due to the transparent substrate of the optical disc loaded in said apparatus.*

*34. An apparatus according to claim 33, wherein said discriminating means comprises:*

*a cartridge for enclosing the optical disc loaded in said apparatus;*

*said cartridge having a discrimination hole which has an open/closed state characteristic which differs depending on a type of said optical disc loaded in said apparatus; and*

*detecting means for detecting the open/closed state characteristic of said discrimination hole.*

*35. An apparatus according to claim 32, further comprising backward-moving means, operative when the optical head is selected by said control means, for moving ones of the optical heads not selected by said control means to outside of the selected optical disc during a recording, reproducing or erasing operation of said information signal.*

*36. An apparatus according to claim 32, further comprising a light emission control circuit for controlling intensity of the light flux emitted by said light emitting means; a focus control circuit for controlling a focus position of the light flux converged on the optical disc; a tracking control circuit for controlling a tracking position of the light flux conversed on the optical disc; and an optical head movement control circuit for controlling said optical head moving means; at least one of said light emission control circuit, said focus control circuit, said tracking control circuit and said optical head movement control circuit being switched with respect to one of the N optical heads selected by said control means.*

*37. An apparatus according to claim 32, wherein the transparent substrates of said N optical discs have thicknesses which include at least one of about 0.3 mm and about 1.2 mm and said converging means have numeral apertures which include at least one of about 0.45 and about 0.8.*

*38. An optical recording/reproducing apparatus according to claim 32, wherein said converging means is an objective lens.*

*39. An optical recording/reproducing apparatus for recording, reproducing or erasing an information signal onto/from any one of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) an optical head provided with N (where N≧2) optical systems each including (i) light emitting means for emitting said light flux, (ii) a converging means for converging the light flux emitted from said light emitting means onto an information layer of one of said N optical discs loaded in said apparatus and (iii) photo detecting means for detecting reflected light from said one of said N optical discs;*

*(b) optical head moving means, adapted to be arranged on one side of an optical disc loaded in said apparatus, for moving said optical head in a direction of the optical disc loaded in said apparatus to traverse a recording track thereof; and*

*(c) control means for causing light emission of said light emitting means in one of said N focus optical systems,*

*wherein said converging means of said N optical systems have one of (a) respective numerical apertures, (b) respective focal distances and (c) respective working distances and perform aberration correction over transparent substrates of respective ones of said N optical discs, one of said N optical systems provided with one of said converging means having one of (a) a larger one of said numerical apertures, (b) a shorter one of said focal distances and (c) a shorter one of said working distances, is selected for use with one of said N optical discs having a thinner one of said transparent substrates, and the one of said focus optical systems having said light emitting means caused to emit light by said control means performs a recording, reproducing or erasing operation of said information signal on an optical disc loaded in said apparatus.*

*40. An apparatus according to claim 39, further comprising disc discriminating means for discriminating a type of said optical disc loaded in said apparatus and for outputting a discrimination signal according to a discrimination result, and wherein said control means causes light emission of the light emitting means of one of said focus optical systems having the converging means that generates a least aberration due to the transparent substrate of the loaded optical disc.*

*41. An apparatus according to claim 40, wherein said discriminating means comprises:*

*a cartridge for enclosing the optical disc loaded in said apparatus;*

*said cartridge having a discrimination hole which has an open/closed state characteristic which differs depending on a type of said optical disc loaded in said apparatus; and*

*detecting means for detecting the open/closed state characteristic of said discrimination hole.*

*42. An apparatus according to claim 39, further comprising a light emission control circuit for controlling intensity of the light flux emitted by said light emitting means; a focus control circuit for controlling a focus position of the light flux converged on the optical disc; and a tracking control circuit for controlling a tracking position of the light flux converged on the optical disc; at least one of said light emission control circuit, said focus control circuit and said*

*tracking control circuit being switched with respect to the selected one of the N optical heads having the focus optical system having said light emitting means caused to emit light by said control means.*

*43. An apparatus according to claim 39, wherein the transparent substrates of said N optical discs have thicknesses which include at least one of about 0.3 mm and about 1.2 mm and said converging means have numeral apertures which include at least one of about 0.45 and about 0.8.*

*44. An apparatus according to claim 39, wherein said converging means is an objective lens.*

*45. An optical recording/reproducing apparatus for recording, reproducing or erasing an information signal onto/from any of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) an optical head including (i) a light emitting means for emitting a light flux, (ii) a light flux dividing means arranged in a radiation direction of said light emitting means for dividing the light flux emitted from said light emitting means into N (where N≧2) light fluxes, (iii) N converging means for converging said N light fluxes onto said information layer of one of said optical discs loaded in said apparatus and (iv) at least one photo detecting means for detecting, reflected light from said one of said optical discs loaded in said apparatus; and*

*(b) optical head moving means, adapted to be arranged on one side of said optical disc loaded in said apparatus, for moving said optical head relative to the optical disc loaded in said apparatus to traverse a recording track thereof;*

*wherein said N converging means have one of (a) respective numerical apertures, (b) respective focal distances and (c) respective working distances and perform aberration correction over transparent substrates of respective ones of said N optical discs, one of said converging means having one of (a) a larger one of said numerical apertures, (b) a shorter one of said focal distances and (c) a shorter one of said working distances, is selected for use with one of said N optical discs having a thinner one of said transparent substrates, and said optical head performs a recording, reproducing or erasing operation of said information signal on said optical disc loaded in said apparatus.*

*46. An apparatus according to claim 45, further comprising light flux selecting means for selecting and passing one of the N light fluxes divided by said light flux dividing means according to a control signal and control means for outputting said control signal to said light flux selecting means to select the light flux to be passed through one of the N converging means.*

*47. An apparatus according to claim 46, further comprising disc discriminating means for discriminating a type of said optical disc loaded in said apparatus and for outputting a discrimination signal according to a discrimination result, and wherein said control means selects one of the light fluxes according to said discrimination signal to be passed through one of the converging means that generates a least aberration due to the transparent substrate of the optical disc loaded in said apparatus.*

*48. An apparatus according to claim 47, wherein said discriminating means comprises:*

*a cartridge for enclosing the optical disc loaded in said apparatus;*

*said cartridge having a discrimination hole which has an open/closed state characteristic which differs depending on a type of said optical disc loaded in said apparatus; and*

*detecting means for detecting the open/closed state characteristic of said discrimination hole.*

*49. An apparatus according to claim 45, wherein the transparent substrates of said N optical discs have thicknesses which include at least one of about 0.3 mm and about 1.2 mm and said converging means have numeral apertures which include at least one of about 0.45 and about 0.8.*

*50. An optical recording/reproducing apparatus according to claim 45, wherein said converging means is an objective lens.*

*51. An optical recording/reproducing apparatus for recording, reproducing or erasing an information signal onto/from any one of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) an optical head including (i) light emitting means for emitting said light flux, (ii) a converging means for converging said light flux onto said information layer, (iii) N (where N≧2) optical wave front transforming means, and (iv) at least one photo detecting means for detecting reflected light from the optical disc; and*

*(b) optical head moving means, adapted to be arranged on one side of an optical disc loaded in said apparatus, for moving said optical head relative to the optical disc loaded in said apparatus to traverse a recording track thereof;*

*wherein a plurality of converging optical systems comprising at least one of (i) said converging means and (ii) said N optical wave front transforming means have one of (a) respective numerical apertures, (b) respective focal distances and (c) respective working distances and perform aberration correction over respective transparent substrates of said N optical discs, one of said converging optical systems having one of (a) a larger one of said numerical apertures, (b) a shorter one of said focal distances and (c) a shorter one of said working distances is selected for one of said N optical discs having a thinner one of said transparent substrates, and said selected converging optical system performs a recording, reproducing or erasing operation of said information signal on said optical disc loaded in said apparatus.*

*52. An apparatus according to claim 51, wherein said optical head further includes holding means for holding said N optical wave front transforming means and for, responsive to a control signal, placing a selected one of said N optical wave front transforming means in an optical path between said light emitting means and said objective lens and control means for outputting said control signal to said holding means to place said selected one of said N optical wave front transforming means in the optical path between said light emitting means and said converging means.*

*53. An apparatus according to claim 51, further comprising disc discriminating means for discriminating a type of said optical disc loaded in said apparatus and for outputting, a discrimination signal according to a discrimination result, and wherein said control means selects one of the light fluxes according to said discrimination signal to be passed through one of the converging optical systems that generates a least aberration due to the transparent substrate of the optical disc loaded in said apparatus.*

54. An apparatus according to claim 53, wherein said discriminating means comprises:

a cartridge for enclosing the optical disc loaded in said apparatus;

said cartridge having a discrimination hole which has an open/closed state characteristic which differs depending on a type of said optical disc loaded in said apparatus; and detecting means for detecting the open/closed state characteristic of said discrimination hole.

55. An apparatus according to claim 51, wherein the transparent substrates of said N optical discs have thicknesses which include at least one of about 0.3 mm and about 1.2 mm and said converging optical systems have disc side numeral apertures which include at least one of about 0.45 and about 0.8.

56. An optical recording/reproducing apparatus according to claim 51, wherein said converging means is an objective lens.

57. An optical recording/reproducing apparatus for recording, reproducing or erasing an information signal onto/from any one of N types (where $N \geqq 2$) of optical discs having transparent substrates of different thicknesses, each of said optical discs having at least a transparent substrate and an information layer, by converging a light flux on said information layer through said transparent substrate, said apparatus comprising:

(a) an optical head including (i) a waveguide formed on a substrate, (ii) N (where $N \geqq 2$) light emitting means for directing waveguide light into said waveguide, (iii) N converging grating couplers for directing the waveguide light received from said N light emitting means to outside of said waveguide and for receiving reflected light from an optical disc loaded in said apparatus and (iv) N photo detecting means for detecting said reflected light through said converging grating couplers and for outputting the detected light as said information signal;

(b) an optical head moving means, adapted to be arranged on one side of the optical disc loaded in said apparatus, for moving said optical head in a radial direction of the optical disc loaded in said apparatus; and (c) control means for providing a control signal to select one of said N light emitting means to emit light, wherein said N converging grating couplers have one of (a) respective numerical apertures, (b) respective focal distances and (c) respective working distances and perform aberration correction over transparent substrates of respective ones of said N optical discs, one of said converging grating couplers having one of (a) a larger one of said numerical apertures, (b) a shorter one of said focal distances and (c) a shorter one of said working distances, is selected for use with one of said N optical discs having a thinner one of said transparent substrates, and the light flux emitted from said selected light emitting means causes said optical head to perform a recording, reproducing or erasing operation of said information signal on said optical disc loaded in said apparatus.

58. An apparatus according to claim 57, further comprising disc discriminating means for discriminating a type of said optical disc loaded in said apparatus and for outputting a discrimination signal according to a discrimination result, and wherein said control means causes light emission of the light emitting means of one of said converging grating couplers that generates a least aberration due to the transparent substrate of the optical disc loaded in said apparatus.

59. An apparatus according to claim 58, wherein said discriminating means comprises:

a cartridge for enclosing the optical disc loaded in said apparatus;

said cartridge having a discrimination hole which has an open/closed state characteristic which differs depending on a type of said optical disc loaded in said apparatus; and detecting means for detecting the open/closed state characteristic of said discrimination hole.

60. An apparatus according to claim 57, further comprising a light emission control circuit for controlling intensity of the light flux emitted by said light emitting means, said light emission control circuit being switched with respect to the selected one of the N converging grating couplers.

61. An apparatus according to claim 57, wherein the transparent substrates of said N optical discs have thicknesses which include at least one of about 0.3 mm and about 1.2 mm and said converging grating couplers have numerical apertures which include at least one of about 0.45 and about 0.8.

62. An optical recording/reproducing apparatus for recording, reproducibly or erasing an information signal onto/from any one of N types (where $N \geqq 2$) of optical discs having transparent substrates of different thicknesses, each of said N optical discs having at least a transparent substrate and an information layer, by converging a light flux on said information layer through said transparent substrate, said apparatus comprising:

(a) an optical head including (i) a waveguide formed on a substrate, (ii) light emitting means for directing waveguide light into said waveguide, (iii) light flux branching means for branching the waveguide light received from said light emitting means into N (where $N \geqq 2$) branch waveguide lights, (iv) N converging grating couplers for directing said N branch waveguide lights to outside of said waveguide and also for receiving reflected light from the optical disc loaded in said apparatus and (v) N photo detecting means for detecting said reflected light through said N converging grating couplers and for outputting the detected light as said information signal;

(b) an optical head moving means, adapted to be arranged on one side of the optical disc loaded in said apparatus, for moving said optical head in a radial direction of the optical disc loaded in said apparatus; and (c) control means for providing a control signal to select and output one of the output signals of said N photo detecting means, wherein said N converging grating couplers have one of (a) respective numerical apertures, (b) respective focal distances and (c) respective working distances and perform aberration correction over transparent substrates of respective ones of said N optical discs, one of said converging grating couplers having, one of (a) a larger one of said numerical apertures, (b) a shorter one of said focal distances and (c) a shorter one of said working distances, is selected for use with one of said N optical discs having a thinner one of said transparent substrates, and said optical head performs a recording, reproducing or erasing operation of said information signal on said optical disc loaded in said apparatus.

63. An apparatus according to claim 62, further comprising disc discriminating means for discriminating a type of

*said optical disc loaded in said apparatus and for outputting a discrimination signal according to a discrimination result, and wherein said control means selects one of the output signals of said photo detecting means for detecting the reflected light returned through the converging gratings coupler that generates a least aberration due to the transparent substrate of the optical disc loaded in said apparatus.*

*64. An apparatus according to claim 63, wherein said discriminating means comprises:*

*a cartridge for enclosing the optical disc loaded in said apparatus;*

*said cartridge having a discrimination hole which has an open/closed state characteristic which differs depending on the type of said optical disc loaded in said apparatus; and*

*detecting means for detecting the open/closed state characteristic of said discrimination hole.*

*65. An apparatus according to claim 62, wherein the transparent substrates of said N optical discs have thicknesses which include at least one of about 0.3 mm and about 1.2 mm and said converging grating couplers have numeral apertures which include at least one of about 0.45 and about 0.8.*

*66. An optical recording/reproducing apparatus for recording, reproducing or erasing an information signal onto/from any one of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) an optical head including (i) a waveguide formed on a substrate, (ii) light emitting means for directing waveguide light into said waveguide, (iii) optical path switching means arranged in an optical path of said waveguide light for switching a propagation direction of said waveguide light according to a control signal to N (where N≧2) propagation directions, (iv) N (where N≧2) converging grating couplers, arranged in the N propagation directions switched by said optical path switching means, for directing waveguide lights traveling in said N propagation directions to outside of said waveguide and for receiving reflected light from the optical disc loaded in said apparatus and (v) photo detecting means for detecting said reflected light through said converging grating couplers and for outputting the reflected light as said information signal; and*

*(b) an optical head moving means, adapted to be arranged on one side of the optical disc loaded in said apparatus, for moving said optical head in a radial direction of the optical disc loaded in said apparatus,*

*wherein said N converging grating couplers have one of (a) respective numerical apertures, (b) respective focal distances and (c) respective working distances and perform aberration correction over transparent substrates of respective ones of said N optical discs, one of said N converging grating couplers having one of (a) a larger one of said numerical apertures, (b) a shorter one of said focal distances and (c) a shorter one of said working distances, is selected for use with one of said N optical discs having a thinner one of said transparent substrates, and said optical head performs a recording, reproducing or erasing operation of said information signal on said optical disc loaded in said apparatus.*

*67. An apparatus according to claim 66, wherein the transparent substrates of said N optical discs have thicknesses which include at least one of about 0.3 mm and about 1.2 mm and said converging grating couplers have numeral apertures which include at least one of about 0.45 and about 0.8.*

*68. An apparatus according to claim 66, further comprising disc discriminating means for discriminating a type of said optical disc loaded in said apparatus and for outputting a discrimination signal according to a discrimination result, and control means for outputting said control signal to said optical path switching means in response to said discrimination signal to switch the propagation direction of the waveguide light from the light emitting means to a direction of one of said converging grating couplers that generates a least aberration due to the transparent substrate of the optical disc loaded in said apparatus.*

*69. An apparatus according to claim 68, wherein said discriminating means comprises:*

*a cartridge for enclosing the optical disc loaded in said apparatus;*

*said cartridge having a discrimination hole which has an open/closed state characteristic which differs depending on the type of said optical disc loaded in said apparatus; and*

*detecting means for detecting the open/closed state characteristic of said discrimination hole.*

*70. An apparatus according to claim 66, wherein said optical path switching means includes deflecting means for changing the propagation direction of the waveguide light by a deflection angle corresponding to a predetermined input signal; tracking error detecting means for detecting a tracking error quantity of a spot converged on the optical disc and for outputting said tracking error quantity as a tracking error signal; and tracking control means for changing said input signal to said deflection means according to said tracking error signal to remove a tracking error of said converged spot.*

*71. An apparatus according to claim 66, wherein said optical path switching means is a surface acoustic wave transducer arranged to intersect with the optical path of the waveguide light emitted from said light emitting means.*

*72. An optical recording/reproducing apparatus for recording, reproducing or erasing an information signal onto/from an optical disc having at least a transparent substrate and an information layer by converging a light flux on said information layer through said transparent substrate, said apparatus comprising:*

*at least one light emitting means for emitting a light flux;*

*a converging means for converging said light flux on said information layer of one of N (where N≧2) optical discs loaded in said apparatus and performing aberration correction over respective transparent substrates of said N optical discs having different thicknesses; and*

*at least one photo detecting means for detecting reflected light from said optical disc loaded in said apparatus through said converging means and for outputting the detected reflected light as an electrical signal,*

*wherein the thickness of the transparent substrate of the optical disc is discriminated by said electrical signal which is output by said at least one photo detecting means for detecting said reflected light from said optical disc through said converging means.*

*73. An optical recording/reproducing apparatus according to claim 72, wherein said converging means is one of an objective lens and a grating lens.*

*74. An optical recording/reproducing apparatus for recording, reproducing or erasing an information signal*

*onto/from an optical disc having at least a transparent substrate and an information layer by converging a light flux on said information layer through said transparent substrate, said apparatus comprising:*

*at least one light emitting means for emitting a light flux;*

*a single objective lens for converging said light flux on said information layer;*

*N (where N≧2) optical wave front transforming elements one of which is arranged in an optical path between said light emitting means and said objective lens; and*

*at least one photo detecting means for detecting reflected light from said optical disc through said objective lens and for outputting the detected reflected light as an electrical signal,*

*wherein composite converging optical systems corresponding to combinations of (i) said objective lens and (ii) said N optical wave front transforming means perform aberration correction over respective transparent substrates of N optical discs having different thicknesses, and the thickness of the transparent substrate of the optical disc loaded in said apparatus is discriminated by said electrical signal.*

*75. An optical recording/reproducing apparatus for recording, reproducing or erasing an information signal onto/from an optical disc having at least a transparent substrate and an information layer by converging a light flux on said information layer through said transparent substrate, said apparatus comprising:*

*at least one light emitting means for emitting a light flux;*

*N grating lenses for performing aberration correction over respective transparent substrates of N (where N≧2) optical discs having different thicknesses to converge said light flux on said information layer of one of said optical discs loaded in said apparatus; and*

*at least one photo detecting means for detecting reflected light from said optical disc loaded in said apparatus through said grating lenses and for outputting the detected reflected light as an electrical signal,*

*wherein the thickness of the transparent substrate of the optical disc loaded in said apparatus is discriminated by said electrical signal.*

*76. An optical recording/reproducing apparatus for recording, reproducing or erasing an information signal onto/from any one of N types (where N≧2) of optical discs having transparent substrates of different thicknesses, each of said N optical discs having at least a transparent substrate and an information layer, by converging a light flux on said information layer through said transparent substrate, said apparatus comprising:*

*(a) an optical head including (i) light emitting means for emitting, said light flux, (ii) optical means for converging said light flux onto said information layer, and (iii) at least one photo detecting means for detecting reflected light from the optical disc; and*

*(b) optical head moving means, adapted to be arranged on one side of an optical disc loaded in said apparatus, for moving said optical head relative to the optical disc loaded in said apparatus to traverse a recording track thereof;*

*wherein said optical means comprises one of (a) N different numerical apertures, (b) N different focal distances and (c) N different working distances and performs aberration correction over respective transparent substrates of said N optical discs, one of (a) a larger one of said numerical apertures, (b) a shorter one of said focal distances and (c) a shorter one of said working distances is selected for one of said N optical discs having a thinner one of said transparent substrates, and said optical means performs a recording, reproducing or erasing operation of said information signal on said optical disc loaded in said apparatus.*

*77. An apparatus according to claim 76, further comprising disc discriminating means for discriminating a type of said optical disc loaded in said apparatus and for outputting a discrimination signal according to a discrimination result, and a control means for selecting the conversed light flux, according to said discrimination signal, that generates a least aberration due to the transparent substrate of the optical disc loaded in said apparatus.*

*78. An apparatus according to claim 77, wherein said discriminating means comprises:*

*a cartridge for enclosing the optical disc loaded in said apparatus;*

*said cartridge having a discrimination hole which has an open/closed state characteristic which differs depending on a type of said optical disc loaded in said apparatus; and*

*detecting means for detecting the open/closed state characteristic of said discrimination hole.*

*79. An apparatus according to claim 76, wherein the transparent substrates of said N optical discs have thicknesses which include at least one of about 0.3 mm and about 1.2 mm and said converging optical systems have disc side numeral apertures which include at least one of about 0.45 and about 0.8.*

*80. An optical recording/reproducing apparatus according to claim 72, further comprising tracking error detecting means for (i) detecting a tracking error from the electrical signal and (ii) discriminating the thickness of the transparent substrate of the optical disc in accordance with the tracking error.*

*81. An optical recording/reproducing apparatus according to claim 80, wherein the converging means comprises an objective lens.*

*82. An optical recording/reproducing apparatus according to claim 80, wherein the converging means comprises a grating lens.*

* * * * *

UNITED STATES PATENT AND TRADEMARK OFFICE

CERTIFICATE OF CORRECTION

PATENT NO. : RE36445

DATED : December 14, 1999

INVENTOR(S) : Naoyasu MIYAGAWA, et al.

It is certified that error appears in the above-identified patent and that said Letters Patent are hereby corrected as shown below:

Figs. 4A and 4B as Amended per the attached sheet.

Signed and Sealed this

Fifteenth Day of May, 2001

*Attest:*

Nicholas P. Godici

NICHOLAS P. GODICI

*Attesting Officer*

*Acting Director of the United States Patent and Trademark Office*

AMENDED
FIG. 4A
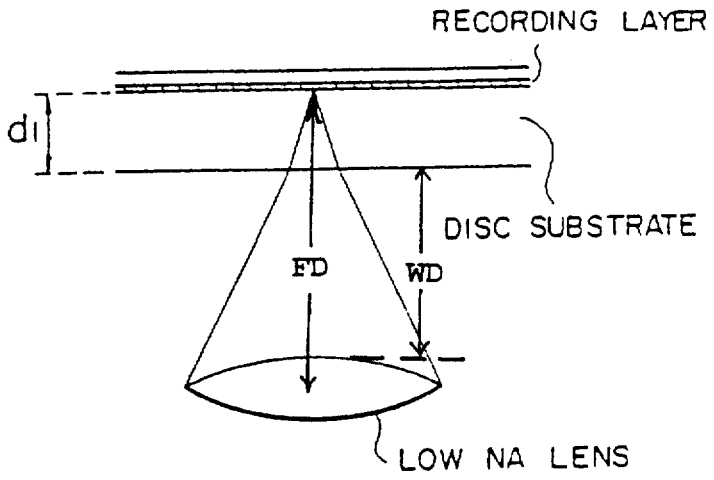
AMENDED
FIG. 4B
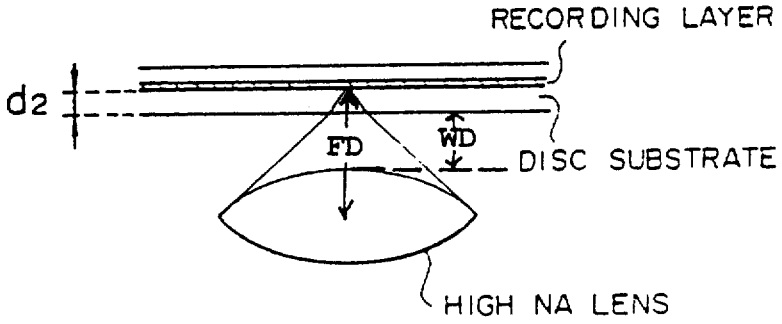

UNITED STATES PATENT AND TRADEMARK OFFICE

CERTIFICATE OF CORRECTION

PATENT NO. : RE 36,445
DATED : December 14, 1999
INVENTOR(S) : N. Miyagawa et al.

It is certified that error appears in the above-identified patent and that said Letters Patent is hereby corrected as shown below:

Column 1,
Above line 1, insert the following paragraph:
-- This application is the parent application of the following continuation reissue applications 09/420,603 filed October 19, 1999, 09/609,699 filed November 22, 1999, 09/609,829 filed on November 22, 1999, 09/460,223 filed December 13, 1999, 09/460,222 filed December 13, 1999, 09/460,222 filed December 13, 1999 and 09/460,221 filed December 13, 1999. --

Signed and Sealed this

Eighth Day of February, 2005

JON W. DUDAS
*Director of the United States Patent and Trademark Office*